(12) United States Patent
Zou et al.

(10) Patent No.: US 11,995,311 B2
(45) Date of Patent: May 28, 2024

(54) ADAPTIVE DISPLAY METHOD AND APPARATUS FOR VIRTUAL SCENE, ELECTRONIC DEVICE, STORAGE MEDIUM, AND COMPUTER PROGRAM PRODUCT

(71) Applicant: Tencent Technology (Shenzhen) Company Limited, Shenzhen (CN)

(72) Inventors: Dancheng Zou, Shenzhen (CN); Shengyu Wu, Shenzhen (CN); Cong Tian, Shenzhen (CN); Meng Qiu, Shenzhen (CN); Jingjing He, Shenzhen (CN); Boyi Liu, Shenzhen (CN); Weijian Cui, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/856,449

(22) Filed: Jul. 1, 2022

(65) Prior Publication Data

US 2022/0334716 A1 Oct. 20, 2022

Related U.S. Application Data

(63) Continuation of application No. PCT/CN2021/125374, filed on Oct. 21, 2021.

(30) Foreign Application Priority Data

Dec. 31, 2020 (CN) .......................... 202011620155.7

(51) Int. Cl.
*G06F 3/04886* (2022.01)
*A63F 13/2145* (2014.01)
(Continued)

(52) U.S. Cl.
CPC ...... *G06F 3/04886* (2013.01); *G06F 3/04815* (2013.01); *G06F 3/04845* (2013.01);
(Continued)

(58) Field of Classification Search
CPC ............. G06F 3/04886; G06F 3/04815; G06F 3/04845; G06F 3/04847;
(Continued)

(56) References Cited

U.S. PATENT DOCUMENTS 9,227,141 B2  1/2016  Mays, Iii et al.
9,772,743 B1*  9/2017  Mueller .............. G06F 3/04886
(Continued)

FOREIGN PATENT DOCUMENTS

CN  106951174 A  7/2017
CN  107203313 A  9/2017
(Continued)

OTHER PUBLICATIONS

Office Action issued on Chinese Application 202011620155.7 dated Aug. 9, 2022, 14 pages.
(Continued)

*Primary Examiner* — Kenny Nguyen
(74) *Attorney, Agent, or Firm* — Crowell & Moring LLP

(57) ABSTRACT

An adaptive display method and apparatus for a virtual scene, an electronic device, a computer-readable storage medium, and a computer program product are provided, and the method includes: displaying a virtual scene and a plurality of buttons with different sizes; obtaining, in response to touch operations on the plurality of buttons with different sizes, touch areas corresponding to the touch operations; and updating and displaying the virtual scene, sizes of buttons included in the updated virtual scene being adapted to the touch areas corresponding to the touch operations.

18 Claims, 12 Drawing Sheets

(51) Int. Cl.
*A63F 13/533* (2014.01)
*G06F 3/04815* (2022.01)
*G06F 3/04845* (2022.01)
*G06F 3/04847* (2022.01)

(52) U.S. Cl.
CPC ...... *G06F 3/04847* (2013.01); *A63F 13/2145* (2014.09); *A63F 13/533* (2014.09)

(58) Field of Classification Search
CPC ......... G06F 2203/04804; G06F 3/0488; G06F 3/0416; G06F 3/0484; A63F 13/2145; A63F 13/533; A63F 13/426; A63F 13/822
See application file for complete search history.

(56) References Cited

U.S. PATENT DOCUMENTS

| | | | | |
|---|---|---|---|---|
| 10,228,849 | B2* | 3/2019 | Keam | G06F 3/04886 |
| 10,345,994 | B2* | 7/2019 | Yuan | G06F 3/041 |
| 10,558,835 | B2* | 2/2020 | Kim | G06V 40/1335 |
| 10,719,206 | B1* | 7/2020 | Bura | G06F 3/04842 |
| 11,086,513 | B2* | 8/2021 | Ahn | A61B 8/467 |
| 11,379,104 | B2* | 7/2022 | Wheeler | G06F 9/451 |
| 2005/0237310 | A1* | 10/2005 | Fabritius | G06F 3/0488 |
| | | | | 345/173 |
| 2009/0091542 | A1* | 4/2009 | Inaba | G06F 1/1616 |
| | | | | 345/173 |
| 2009/0327977 | A1* | 12/2009 | Bachfischer | G06F 3/04883 |
| | | | | 715/863 |
| 2010/0156808 | A1* | 6/2010 | Stallings | G06F 3/04886 |
| | | | | 345/173 |
| 2011/0009195 | A1* | 1/2011 | Porwal | A63F 13/533 |
| | | | | 463/37 |
| 2011/0300934 | A1* | 12/2011 | Toy | A63F 13/2145 |
| | | | | 463/31 |
| 2011/0314093 | A1* | 12/2011 | Sheu | G06F 3/14 |
| | | | | 709/203 |
| 2012/0068948 | A1* | 3/2012 | Tomoda | G06F 3/04886 |
| | | | | 345/173 |
| 2013/0005469 | A1* | 1/2013 | Selim | A63F 13/2145 |
| | | | | 463/37 |
| 2013/0061149 | A1* | 3/2013 | Ikeda | G06F 3/04817 |
| | | | | 715/738 |
| 2013/0093680 | A1* | 4/2013 | Ogita | G06F 1/1626 |
| | | | | 345/174 |
| 2013/0120278 | A1* | 5/2013 | Cantrell | G06F 3/04886 |
| | | | | 345/173 |
| 2014/0082560 | A1* | 3/2014 | Okada | H04N 1/00411 |
| | | | | 715/835 |
| 2015/0058761 | A1* | 2/2015 | Cai | G06F 3/04886 |
| | | | | 715/763 |
| 2015/0116230 | A1* | 4/2015 | Hsiao | G06F 3/04883 |
| | | | | 345/173 |
| 2015/0160794 | A1* | 6/2015 | Huang | G06F 3/04842 |
| | | | | 715/810 |
| 2015/0324070 | A1* | 11/2015 | Kim | G06F 3/0416 |
| | | | | 715/825 |
| 2016/0224234 | A1* | 8/2016 | Sheng | G06F 3/0482 |
| 2016/0313912 | A1* | 10/2016 | Keam | G06F 3/04845 |
| 2017/0168691 | A1* | 6/2017 | Johansson | G06Q 30/0269 |
| 2017/0308269 | A1* | 10/2017 | Kwon | G06F 3/04845 |
| 2017/0344804 | A1* | 11/2017 | Zhou | G06V 40/12 |
| 2017/0371486 | A1* | 12/2017 | Neiswander | G06F 3/0488 |
| 2018/0114047 | A1* | 4/2018 | Kim | G06F 3/0488 |
| 2018/0239582 | A1 | 8/2018 | Goss, III | |
| 2018/0335856 | A1* | 11/2018 | Wolters | G06F 1/1694 |
| 2019/0286879 | A1* | 9/2019 | Li | G06V 40/13 |
| 2020/0110524 | A1 | 4/2020 | Lemay et al. | |
| 2020/0233540 | A1* | 7/2020 | Salter | B60R 25/23 |
| 2020/0293746 | A1* | 9/2020 | Hu | G06F 21/32 |
| 2020/0316469 | A1* | 10/2020 | Lei | A63F 13/426 |
| 2020/0387297 | A1* | 12/2020 | Wheeler | G06F 3/04817 |
| 2022/0134220 | A1* | 5/2022 | Dang | A63F 13/837 |
| | | | | 463/37 |
| 2022/0137800 | A1* | 5/2022 | Long | A63F 13/92 |
| | | | | 715/769 |
| 2022/0291822 | A1* | 9/2022 | Wheeler | G06F 3/04847 |
| 2022/0297004 | A1* | 9/2022 | Yang | A63F 13/2145 |
| 2022/0334716 | A1* | 10/2022 | Zou | G06F 3/04886 |

FOREIGN PATENT DOCUMENTS

| | | |
|---|---|---|
| CN | 107748638 A | 3/2018 |
| CN | 109062496 A | 12/2018 |
| CN | 109753327 A | 5/2019 |
| CN | 111324276 A | 6/2020 |
| CN | 111632375 A | 9/2020 |
| CN | 112090067 A | 12/2020 |
| CN | 112684970 A | 4/2021 |
| JP | 6-131094 | 5/1994 |
| JP | 2005-293175 | 10/2005 |
| JP | 2006-268313 | 10/2006 |

OTHER PUBLICATIONS

Office Action issued for Japanese Application JP2022-556518 dated Oct. 11, 2020, with translation, 7 pages.

* cited by examiner

ADAPTIVE DISPLAY METHOD AND APPARATUS FOR VIRTUAL SCENE, ELECTRONIC DEVICE, STORAGE MEDIUM, AND COMPUTER PROGRAM PRODUCT

RELATED APPLICATION

This application is a continuation of International Patent Application No. PCT/CN2021/125374, filed Oct. 21, 2021, which claims priority to Chinese Patent Application No. 202011620155.7, entitled "ADAPTIVE DISPLAY METHOD AND APPARATUS FOR VIRTUAL SCENE, ELECTRONIC DEVICE, STORAGE MEDIUM, AND COMPUTER PROGRAM PRODUCT" filed on Dec. 31, 2020. The contents of International Patent Application No. PCT/CN2021/125374 and Chinese Patent Application No. 202011620155.7 are each incorporated by reference in their entirety.

FIELD OF THE TECHNOLOGY

This application relates to human-computer interaction techniques of a computer, and in particular, to an adaptive display method and apparatus for a virtual scene, an electronic device, a computer-readable storage medium, and a computer program product.

BACKGROUND OF THE DISCLOSURE

The display technology based on graphics processing hardware expands channels for perceiving an environment and obtaining information. Particularly, the virtual scene display technology can realize diversified interaction between virtual objects controlled by users or artificial intelligence according to actual application requirements. The virtual scene display technology has various typical application scenarios, for example, can simulate real battle processes between virtual objects in virtual scenes such as a military exercise simulation and a game.

Buttons in virtual scenes are widely used, for example, a button with an attack function and a joystick button with a function of operating a virtual object to move. The buttons in the virtual scenes are used by clicking, pressing, sliding, and other operations, to realize corresponding functions.

In the related technology, for the convenience of use, before a virtual scene is run, a user needs to manually adjust sizes of buttons in the virtual scene one by one, so that the adjusted buttons are convenient for the user to operate when the virtual scene is run. However, the frequent adjustment manner is too cumbersome to affect efficiency of human-computer interaction in the virtual scene, thereby affecting user experience.

SUMMARY

Embodiments of this application provide an adaptive display method and apparatus for a virtual scene, an electronic device, a computer-readable storage medium, and a computer program product, which can automatically adjust sizes of buttons in a virtual scene, and improve efficiency of human-computer interaction in the virtual scene.

The technical solutions in the embodiments of this application are implemented as follows:

An embodiment of this application provides an adaptive display method for a virtual scene, performed by an electronic device, the method including:

displaying a virtual scene and a plurality of buttons with different sizes;

obtaining, in response to touch operations on the plurality of buttons with different sizes, touch areas corresponding to the touch operations; and updating and displaying the virtual scene, sizes of buttons included in the updated virtual scene being adapted to the touch areas corresponding to the touch operations.

An embodiment of this application provides an adaptive display apparatus for a virtual scene, including:

a display module, configured to display a virtual scene and a plurality of buttons with different sizes;

a processing module, configured to obtain, in response to touch operations on the plurality of buttons with different sizes, touch areas corresponding to the touch operations; and an update module, configured to update and display the virtual scene, sizes of buttons included in the updated virtual scene being adapted to touch areas that can be realized by a touch entity.

An embodiment of this application provides an electronic device, including:

a memory, configured to store executable instructions; and a processor, configured to perform, by executing the executable instructions stored in the memory, the adaptive display method for a virtual scene provided in the embodiments of this application.

An embodiment of this application provides a computer-readable storage medium storing executable instructions, the executable instructions, when executed by a processor, causing the processor to implement the adaptive display method for a virtual scene provided in the embodiments of this application.

An embodiment of this application provides a computer program product, including computer programs or instructions, the computer programs or instructions, when executed by a processor, implementing the adaptive display method for a virtual scene provided in the embodiments of this application.

The embodiments of this application have the following beneficial effects:

Touch areas corresponding to touch operations are detected through a plurality of buttons with different sizes in a virtual scene, and sizes of the buttons included in the virtual scene are adjusted to be adapted to the touch areas corresponding to the touch operations. In this way, the sizes of the buttons can be adjusted with high-efficiency human-computer interaction operations, efficiency of human-computer interaction in the virtual scene can be improved, and resource consumption of graphics processing hardware for related computing of the human-computer interaction can be significantly saved.

DESCRIPTION OF EMBODIMENTS

Figure 1A:
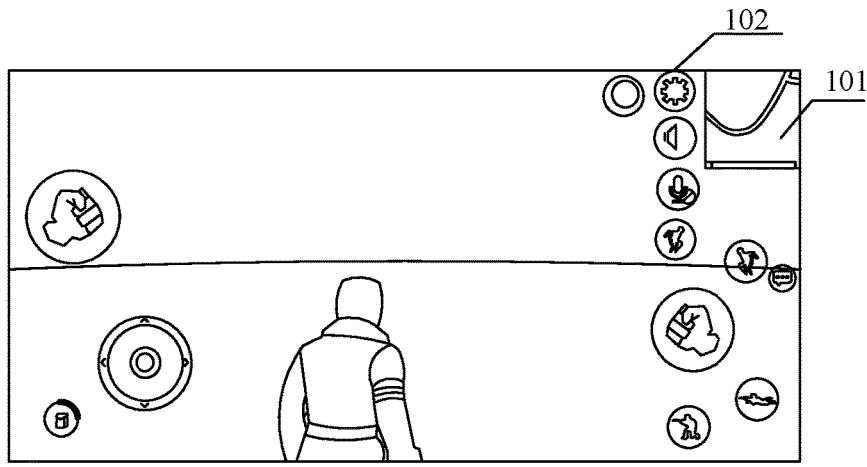
FIG. 1A is a schematic diagram of interfaces of adjusting sizes of buttons according to the related technology.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, nouns and terms involved in the embodiments of this application are described. The nouns and terms provided in the embodiments of this application are applicable to the following explanations.

1) Virtual scene: it is a scene that is outputted by using a device and that is different from the real world. A visual perception of the virtual scene can be formed with the aid of naked eyes or devices, for example, by using two-dimensional images outputted by using a display screen or three-dimensional images outputted by using a three-dimensional display technology such as a three-dimensional projection, virtual reality, or augmented reality technology. In addition, a variety of perceptions simulating the real world such as an auditory perception, a tactile perception, an olfactory perception, and a motion perception can be further formed by using a variety of possible hardware.

2) "In response to": it is used for representing a condition or status on which one or more operations to be performed depend. When the condition or status is satisfied, the one or more operations may be performed immediately or after a set delay. Unless explicitly stated, there is no limitation on the order in which the plurality of operations are performed.

3) Client: it is an application configured to provide various services and being run on a terminal, for example, a game client and a military exercise simulation client.

4) Virtual object: it is an object that can interact with various persons and things in a virtual scene, or a movable object in a virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene.

For example, the virtual object may be a player character controlled through an operation on a client, or may be an artificial intelligence (AI) character set in a virtual scene battle through training, or may be a non-player character (NPC) set in a virtual scene interaction. For example, the virtual object may be a virtual character for adversarial interaction in a virtual scene. For example, a quantity of virtual objects participating in the interaction in the virtual scene may be preset, or may be dynamically determined according to a quantity of clients participating in the interaction.

For example, in a shooting game, the user may control the virtual object to descend freely, glide, parachute, or the like in the sky of the virtual scene, or run, jump, crawl, stoop to move forward, or the like on the land, or control the virtual object to swim, float, dive, or the like in the ocean. Certainly, the user may alternatively control the virtual object to drive a virtual vehicle to move in the virtual scene. For example, the virtual vehicle may be a virtual car, a virtual aircraft, a virtual yacht, or the like. Herein, the foregoing scene is merely used as an example for description, which is not specifically limited in the embodiments of this application. The user may alternatively control the virtual object to perform adversarial interaction with another virtual object through a virtual prop, for example, the virtual prop may be a throwing virtual prop such as a grenade, a cluster mine, a sticky grenade, or the like, or may be a shooting virtual prop such as a machine gun, a pistol, a rifle, or the like. Types of virtual props are not specifically limited in this application.

5) Scene data: it represents various characteristics represented by an object in a virtual scene in an interaction process, for example, a position of the object in the virtual scene may be included. Certainly, different types of characteristics may be included according to types of virtual scenes. For example, in a virtual scene of a game, the scene data may include waiting times (which depend on a number of times of which the same function may be used in a specified time) when various functions are set in the virtual scene, and may also represent attribute values of various states of a game role, for example, a health point (also referred to as a red bar), and a magic point (also referred to as a blue bar).

6) Touch area: it is also referred to as a contacted area. An area of a thing to which a user (a touch entity) can touch through contacting the thing is a touch hotspot area of the user on the thing.

During a game, there is usually a problem that different players have fingers with different sizes. For example, Asian players have slender fingers, so sizes of buttons of an entire user interface (UI) thereof are also be smaller. European and American players are naturally tall and have relatively large fingers. If the smaller buttons are still used, a series of problems may be caused, for example, the operation experience may be poor, the click may not meet expectations, and mistaken touch is easy to occur.

Figure 1B:
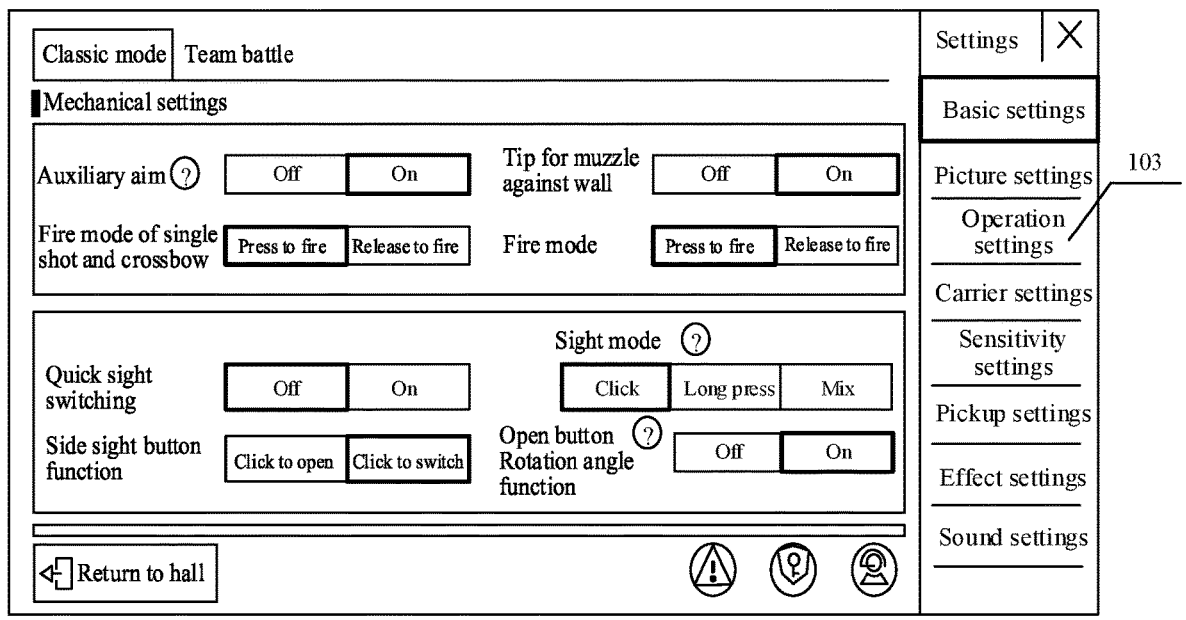
FIG. 1B is another schematic diagram of interfaces of adjusting sizes of buttons according to the related technology.
Figure 1C:
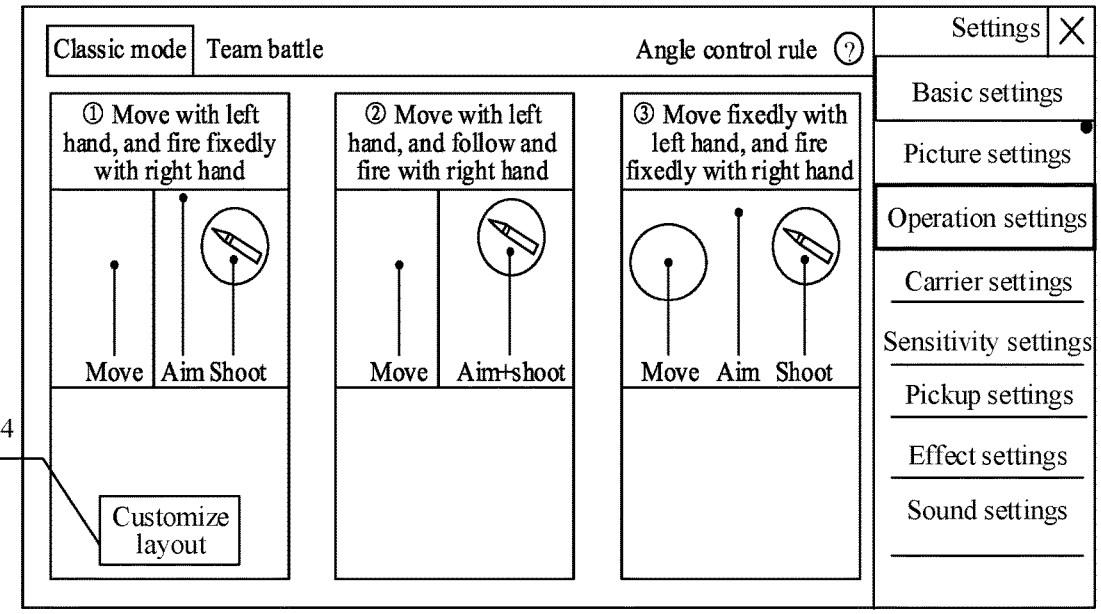
FIG. 1C is another schematic diagram of interfaces of adjusting sizes of buttons according to the related technology.
Figure 1D:
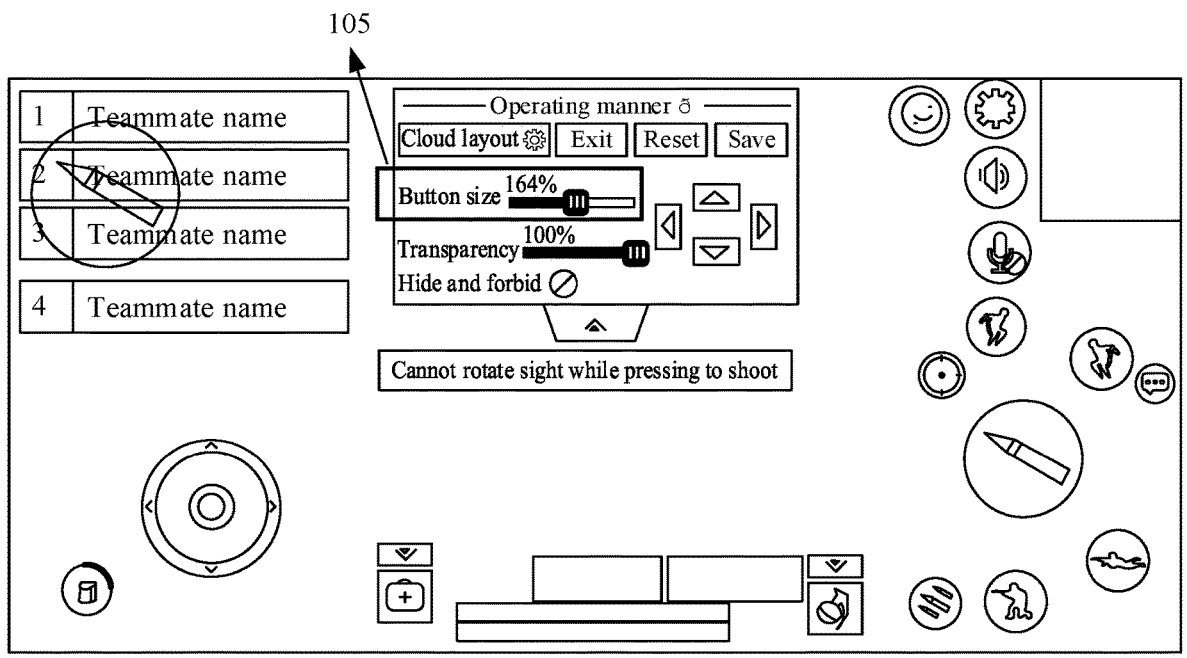
FIG. 1D is another schematic diagram of interfaces of adjusting sizes of buttons according to the related technology.

In the related technology, an operation procedure of adjusting a button size are as follows: when a player is in a battle interface, 1) as shown in FIG. 1A, click a "settings" button 102 on a left side of a minimap 101, to enter a setting page shown in FIG. 1B; 2) as shown in FIG. 1B, click an operation setting tab 103 in a list, to enter an interface adjustment interface shown in FIG. 1C; 3) as shown in FIG. 1C, click a "customize layout" button 104, to enter a customized adjustment interface; 4) click a button whose size needs to be adjusted, to enter a customized adjustment interface shown in FIG. 1D; 5) as shown in FIG. 1D, adjust the size by using a slider 105; and 6) click a "save" button after the adjustment is completed, that is, complete setting of the button size.

However, operation levels of the button size adjustment in the related technology are relatively deep, and for novices or casual players, high understanding costs are required, and it is difficult to learn and adjust a most suitable button size by themselves. Even if the players understand the adjustment method, the players still need to perform complex adjustment for a single button, which may result in adjustment on the button size for a long time, and then causes poor user experience.

To resolve the foregoing problems, the embodiments of this application provide an adaptive display method and apparatus for a virtual scene, an electronic device, a computer-readable storage medium, and a computer program product, which can automatically adjust sizes of buttons in a virtual scene, and improve efficiency of human-computer interaction in the virtual scene.

An exemplary application of which an electronic device provided in the embodiments of this application is described below. The electronic device provided in the embodiments of this application may be implemented as various types of user terminals such as a notebook computer, a tablet computer, a desktop computer, a set-top box or a mobile device (for example, a mobile phone, a portable music player, a personal digital assistant (PDA), a dedicated messaging device, or a portable game device), or may be implemented as a server. An exemplary application of which the device being implemented as a terminal is described below.

To make the adaptive display method for a virtual scene provided in an embodiment of this application more comprehensible, an exemplary implementation scenario of the adaptive display method for a virtual scene provided in this embodiment of this application is first described, and a virtual scene may be completely outputted based on the terminal or may be collaboratively outputted based on the terminal and the server.

In some embodiments, the virtual scene may be a picture displayed in a military exercise simulation. In the virtual scene, users may simulate battles, strategies or tactics through virtual objects belonging to different teams, which has a great guiding role in commanding military battles.

In some embodiments, the virtual scene may be an environment for game roles to interact, for example, may be used for the game roles to battle in the virtual scene. By controlling actions of virtual objects, two parties may interact in the virtual scene, so that users can relieve their live pressure during the game.

Figure 2A:
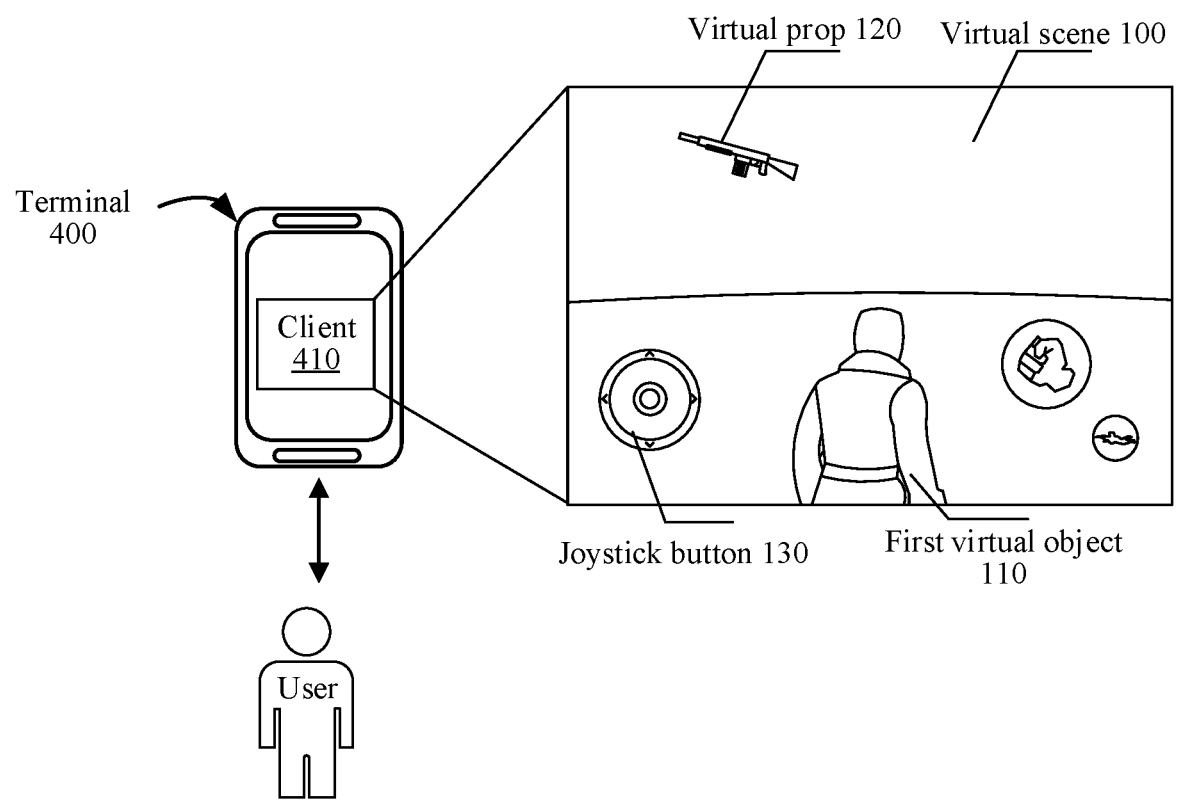
FIG. 2A is a schematic diagram of an application mode of an adaptive display method for a virtual scene according to an embodiment of this application.

In an implementation scenario, FIG. 2A is a schematic diagram of an application mode of an adaptive display method for a virtual scene according to an embodiment of this application, which is applicable to some application modes that completely rely on a computing capability of a terminal 400 to complete calculation for relevant data of a virtual scene 100. For example, a game in a stand-alone version/offline mode may complete outputs of virtual scenes by the terminal 400 such as a smartphone, a tablet computer, and a virtual reality/augmented reality device.

When a visual perception of the virtual scene 100 is formed, the terminal 400 calculates data required for display through graphics computing hardware, completes loading, parsing and rendering of the display data, and outputs a video frame capable of forming the visual perception for the virtual scene on graphics output hardware. For example, the terminal displays two-dimensional video frames on a display screen of the smartphone, or projects video frames that realize a three-dimensional display effect on lenses of augmented reality/virtual reality glasses. In addition, to enrich a perception effect, the device may also form one or more of an auditory perception, a tactile perception, a motion perception, and a taste perception by means of different hardware.

As an example, the terminal 400 runs a client 410 (for example, a stand-alone game application), and outputs a virtual scene including role-playing in a running process of the client 410. The virtual scene is an environment for game roles to interact, for example, may be a plain, a street, a valley, or the like for the game roles to battle against. The virtual scene includes a first virtual object 110 and a virtual prop 120. The first virtual object 110 may be a game role controlled by a user (or a player), that is, the first virtual object 110 is controlled by a real user, and operates in the virtual scene in response to operations of the real user on buttons (including a joystick button, an attack button, a defense button, and the like). For example, when the real user moves the joystick button to the left, the first virtual object moves to the left in the virtual scene; and the user may also stay still, jump, and use various functions (such as skills and props). The virtual prop 120 may be a battle tool used by the first virtual object 110 in the virtual scene. For example, the first virtual object 110 may pick up the virtual prop 120 in the virtual scene by moving the joystick button, so as to perform a game battle by using a function of the virtual prop 120.

For example, the user performs touch operations on a plurality of buttons with different sizes displayed on the client 410 to determine touch areas corresponding to the touch operations, and adjusts sizes of buttons (for example, a joystick button 130) included in the virtual scene based on the touch areas corresponding to the touch operations, so that the adjusted sizes of the buttons are adapted to the touch areas corresponding to the touch operations, so as to perform subsequent human-computer interaction based on the adjusted buttons. For example, the user controls, by the adjusted control joystick button 130, the first virtual object 110 to move to the virtual prop 120 in the virtual scene, to pick up the virtual prop 120 in the virtual scene. In this way, the user does not need to manually adjust the sizes of buttons in the virtual scene one by one, so that the sizes of buttons are adjusted with high-efficiency human-computer interaction operations, and efficiency of human-computer interaction in the virtual scene is improved.

Figure 2B:
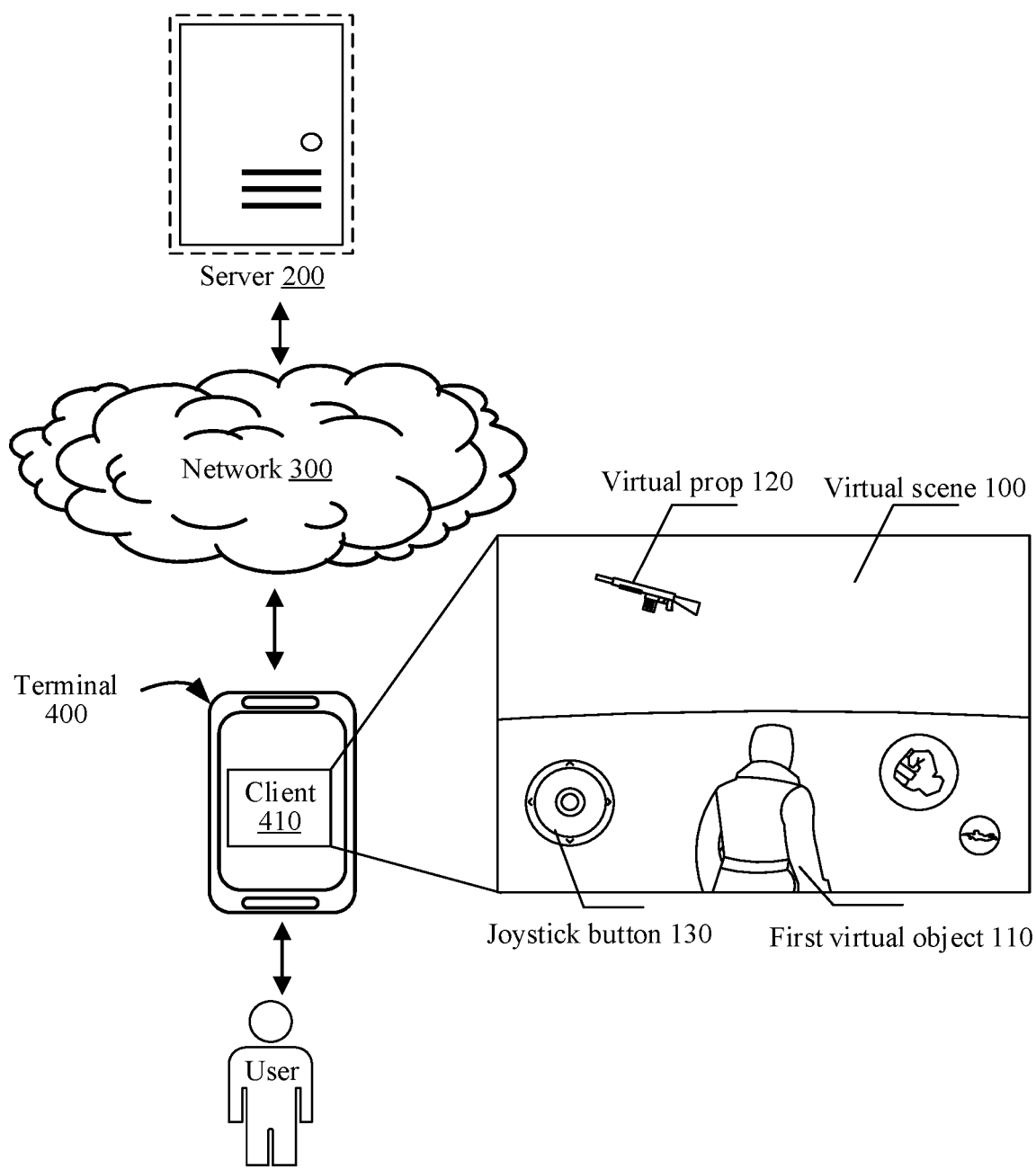
FIG. 2B is a schematic diagram of an application mode of an adaptive display method for a virtual scene according to an embodiment of this application.

In another implementation scenario, FIG. 2B is a schematic diagram of an application mode of an adaptive display method for a virtual scene according to an embodiment of this application, which is applied to a terminal 400 and a server 200, and is applicable to an application mode that relies on a computing capability of the server 200 to complete calculation for a virtual scene and outputs the virtual scene on the terminal 400.

By using an example in which a visual perception of a virtual scene 100 is formed, the server 200 calculates related display data of the virtual scene and send the data to the terminal 400. The terminal 400 relies on graphics computing hardware to complete loading, parsing and rendering of the display data, and relies on graphics output hardware to output the virtual scene to form the visual perception. For example, the terminal may display two-dimensional video frames on a display screen of a smartphone, or project video frames that realize a three-dimensional display effect on lenses of augmented reality/virtual reality glasses. It may be understood that, the perception on the form of the virtual scene may be outputted by means of corresponding hardware of the terminal, for example, a microphone output is used for forming an auditory perception, a vibrator output is used for forming a tactile perception, and the like.

As an example, the terminal 400 runs a client 410 (for example, an online game application), and performs game interaction with other users by connecting to a game server (namely, the server 200). The terminal 400 outputs the virtual scene 100 of the client 410, where the virtual scene 100 includes a first virtual object 110 and a virtual prop 120. The first virtual object 110 may be a game role controlled by a user, that is, the first virtual object 110 is controlled by a real user, and operates in the virtual scene in response to operations of the real user on buttons (for example, a joystick button, an attack button, a defense button, and the like). For example, when the real user moves a joystick to the left, the first virtual object moves to the left in the virtual scene; and the user may also stay still, jump, and use various functions (such as skills and props). The virtual prop 120 may be a battle tool used by the first virtual object 110 in the virtual scene. For example, the first virtual object 110 may pick up the virtual prop 120 in the virtual scene by moving the joystick button, so as to perform a game battle by using a function of the virtual prop 120.

For example, the user performs touch operations on a plurality of buttons with different sizes displayed on the client 410, and the client 410 sends the touch operations of the user to the server 200 through a network 300. The server 200 determines touch areas corresponding to the touch operations according to the touch operations of the user, and adjusts sizes of buttons (for example, a joystick button 130) included in the virtual scene based on the touch areas corresponding to the touch operations, so that the adjusted sizes of the buttons are adapted to the touch areas corresponding to the touch operations. The server 200 sends the adjusted buttons to the client 410, and the client 410 displays the adjusted buttons (for example, the joystick button 130) after receiving the adjusted buttons, so as to perform subsequent human-computer interaction based on the adjusted buttons. For example, the user controls, by the adjusted control joystick button 130, the first virtual object 110 to move to the virtual prop 120 in the virtual scene, to pick up the virtual prop 120 in the virtual scene, so that the sizes of buttons can be adjusted with high-efficiency human-computer interaction operations, and efficiency of human-computer interaction in the virtual scene can be improved.

In some embodiments, the terminal 400 may implement the adaptive display method for a virtual scene provided in this embodiment of this application by running a computer program, for example, the computer program may be a native program or a software module in an operating system; may be a native application (APP), that is, a program that needs to be installed in the operating system to run, for example, a game APP (namely, the above-mentioned client 410); may be an applet, that is, a program that can be run only by downloading the program into a browser environment; or may be a game applet that can be embedded into any APP. In summary, the above-mentioned computer program may be any form of an application, a module or a plug-in.

This embodiment of this application may be implemented by a cloud technology. The cloud technology is a hosting technology that unifies a series of resources such as hardware, software, and networks in a wide area network or a local area network to implement computing, storage, processing, and sharing of data.

The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources.

As an example, the server 200 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 400 may be a smartphone, a tablet computer, a notebook computer, a desktop computer, a smart speaker, a smartwatch, or the like, but is not limited thereto. The terminal 400 and the server 200 may be directly or indirectly connected in a wired or wireless communication manner. This is not limited in this embodiment of this application.

Figure 3A:
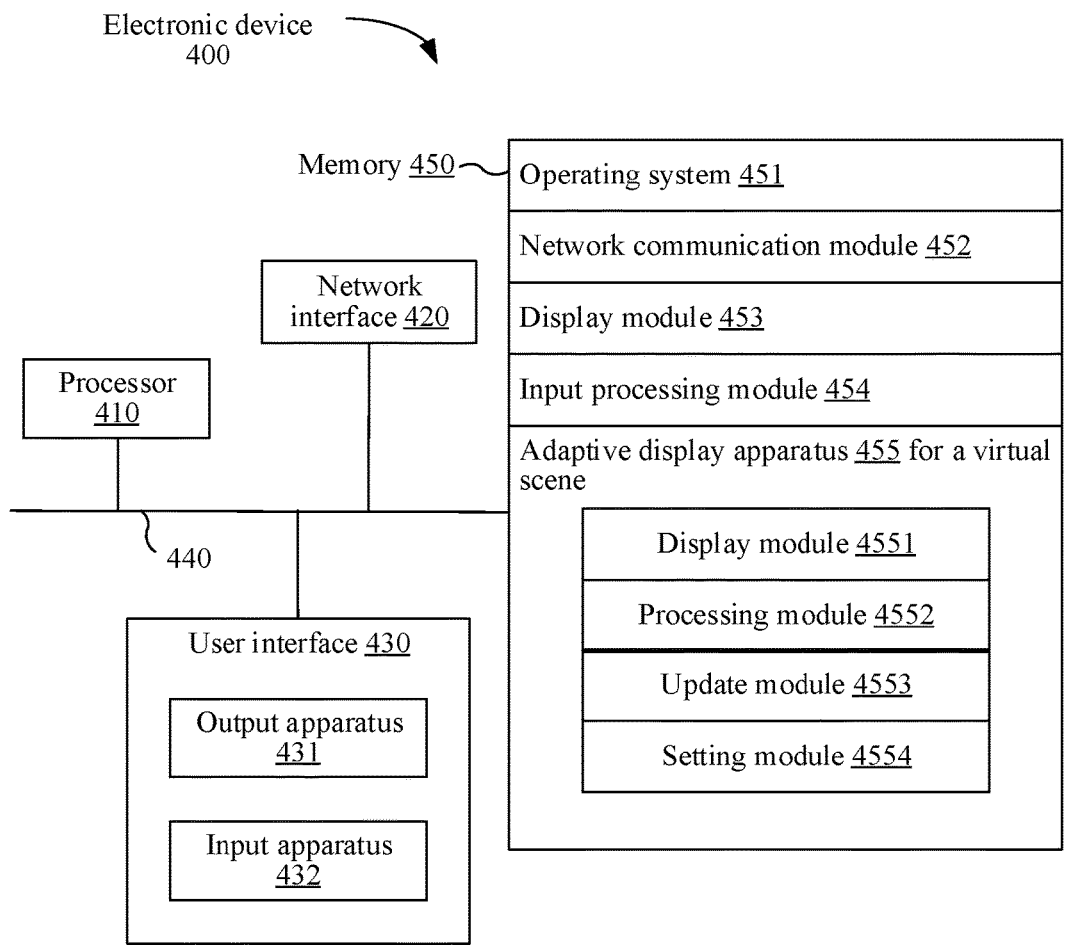
FIG. 3A is a schematic structural diagram of an electronic device configured to adaptively displaying according to an embodiment of this application.

FIG. 3A is a schematic structural diagram of an electronic device configured to adaptively displaying according to an embodiment of this application. By using an example in which the electronic device is a terminal for description, the electronic device shown in FIG. 3A includes at least one processor 410, a memory 450, at least one network interface 420, and a user interface 430. All the components in the electronic device 400 are coupled together by using a bus system 440. It may be understood that the bus system 440 is configured to implement connection and communication between the components. In addition to a data bus, the bus system 440 further includes a power bus, a control bus, and a status signal bus. However, for clear description, various types of buses in FIG. 3A are marked as the bus system 440.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor or any conventional processor, or the like.

The user interface 430 includes one or more output apparatuses 431 that can display media content, including one or more loudspeakers and/or one or more visual display screens. The user interface 430 further includes one or more input apparatuses 432, including user interface components that facilitate inputting of a user, such as a keyboard, a mouse, a microphone, a touch display screen, a camera, and other input button and control.

The memory 450 may be a removable memory, a non-removable memory, or a combination thereof. Exemplary hardware devices include a solid-state memory, a hard disk drive, an optical disc driver, or the like. For example, the memory 450 includes one or more storage devices physically away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of this application is to include any other suitable type of memories.

In some embodiments, the memory 450 may store data to support various operations. Examples of the data include a program, a module, and a data structure, or a subset or a superset thereof, which are described below by using examples.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Exemplary network interfaces 420 include: Bluetooth, wireless compatible authentication (WiFi), a universal serial bus (USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the adaptive display apparatus for a virtual scene provided in this embodiment of this application may be implemented by means of software, FIG. 2A shows an adaptive display apparatus 455 for a virtual scene stored in the memory 450. The adaptive display apparatus 455 may be software in a form such as a program and a plug-in, and include the following software modules: a display module 4551, a processing module 4552, an update module 4553, and a setting module 4554. These modules are logical modules, and may be randomly combined or further divided based on a function to be performed. The following describes a function of each module.

Figure 3B:
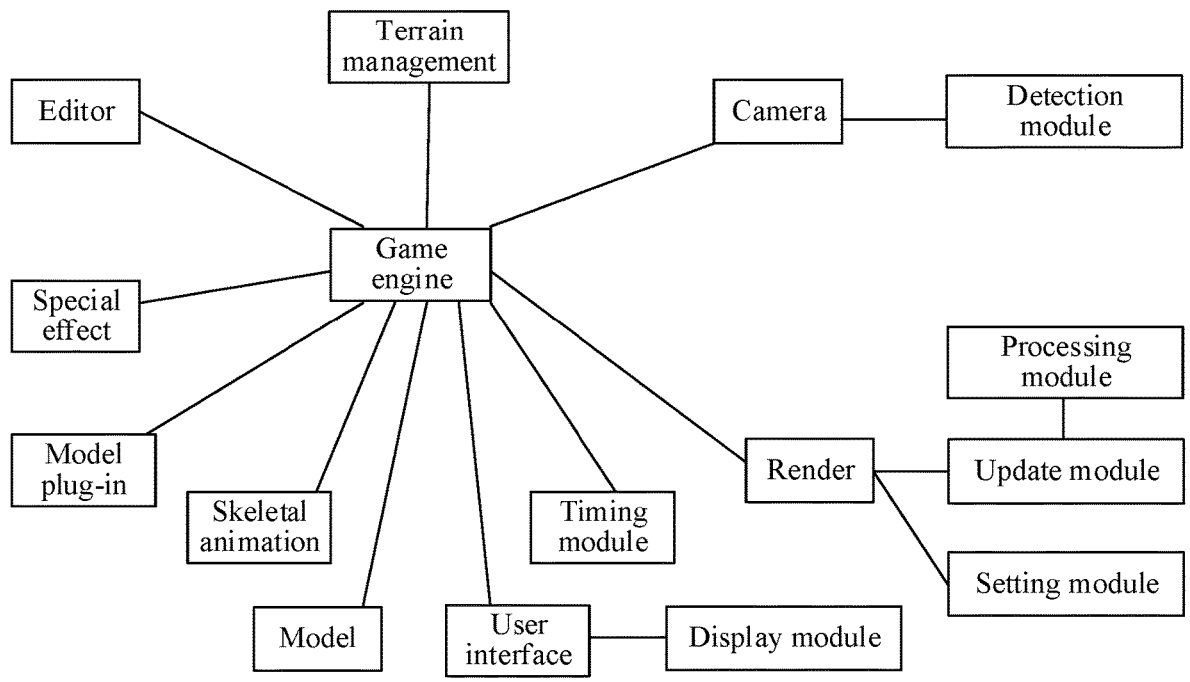
FIG. 3B is a schematic principle diagram of a human-computer interaction engine installed in an adaptive display apparatus for a virtual scene according to an embodiment of this application.

FIG. 3B is a schematic principle diagram of a human-computer interaction engine installed in an adaptive display apparatus for a virtual scene according to an embodiment of this application. By using an example of being applied to a game, the human-computer interaction engine may also be referred to as a game engine. The game engine refers to core components of some pre-written editable computer game systems or some interactive real-time graphics applications. These systems provide game designers with various tools needed to write games, and a purpose thereof is to allow the game designers to make game programs easily and quickly without starting from scratch. The game engine includes: a rendering engine (namely, "a renderer", including a two-dimensional image engine and a three-dimensional image engine), a physical engine, an obstacle detection system, a sound effect, a script engine, a computer animation, artificial intelligence, a network engine, and scene management. The game engine is a set of codes (instructions) that can be recognized by a machine designed for a machine running a certain type of games. The game engine is like an engine and controls running of the game. A game program may be divided into two parts: a game engine and game resources. The game resources include images, sounds, animations, and the like. A game is equal to an engine (program codes) plus resources (images, sounds, animations, and the like), and the game engine invokes these resources sequentially according to requirements of game design.

The adaptive display method for a virtual scene provided in this embodiment of this application is implemented in a manner that each module in the adaptive display apparatus for a virtual scene shown in FIG. 3A invokes relevant components of the human-computer interaction engine shown in FIG. 3B, which is exemplarily described below.

For example, the display module 4551 is used for displaying a virtual scene and a plurality of buttons with different sizes. The display module 4551 invokes a user interface part in the game engine shown in FIG. 3B to realize interaction between the user and a game; makes a two-dimensional or three-dimensional model by invoking a model part in the game engine; assigns material maps to the model according to different faces through a skeletal animation part after the model is made, which is equivalent to covering bones with skin; and finally calculates all effects, for example, the model, an animation, light and shadow, and special effects, through a rendering part in real time, and displays the effects on a human-computer interaction interface.

For example, the processing module 4552 is configured to obtain, in response to touch operations on the plurality of buttons with different sizes, touch areas corresponding to the touch operations; update and display the virtual scene by invoking the update module 4553; render, by a rendering module, buttons included in the virtual scene; and display the buttons on the human-computer interaction interface, so that sizes of the buttons included in the updated virtual scene on the human-computer interaction interface is adapted to the touch areas corresponding to the touch operations.

For example, the setting module 4554 is configured to display a button adaptive detection entrance in the virtual scene; and the setting module 4554 is configured to invoke, in response to a trigger operation on the button adaptive detection entrance, the rendering module of the game engine shown in FIG. 3B; render, by a rendering module, the button adaptive detection entrance; and display the button adaptive detection entrance on the human-computer interaction interface.

Figure 4A:
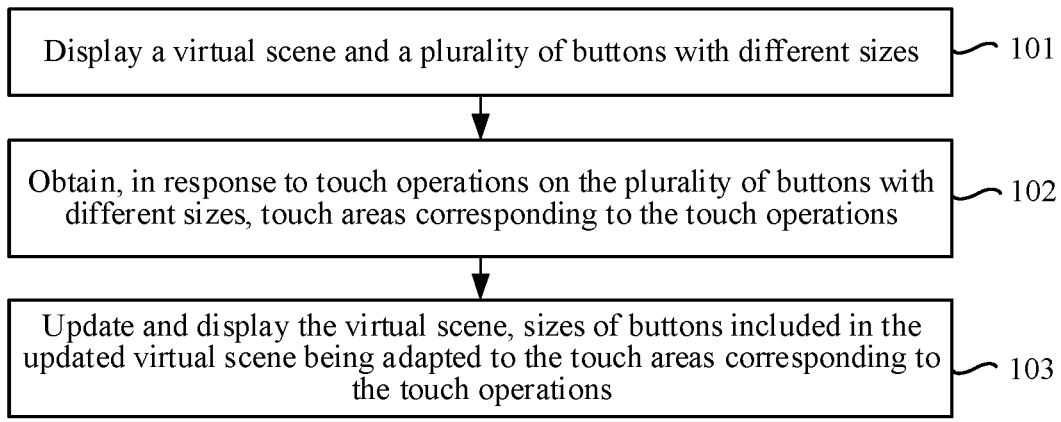
FIG. 4A is a schematic flowchart of an adaptive display method for a virtual scene according to an embodiment of this application.

As described above, the adaptive display method for a virtual scene provided in this embodiment of this application may be implemented by various types of electronic devices, for example, a terminal. FIG. 4A is a schematic flowchart of an adaptive display method for a virtual scene according to an embodiment of this application, which is described with reference to steps shown in FIG. 4A.

In the following steps, a plurality of buttons with different sizes may be functional buttons associated with interaction functions (for example, selecting a role, and controlling the role) in a virtual scene, for example, a joystick button for controlling a virtual object to move, and an attack button for controlling a virtual object to attack other virtual objects. In this way, in a process that a touch entity operates the plurality of functional buttons with different sizes, an electronic device learns, in response to touch operations on the functional buttons, touch areas that can be realized by the touch entity (namely, touch areas corresponding to the touch operations), and then updates the virtual scene after the touch areas that can be realized based on the touch entity are automatically determined or are determined by a user to need to be updated, so that sizes of the buttons included in the virtual scene are adapted to the touch areas that can be realized by the user.

In the following steps, the plurality of buttons with different sizes may also be buttons exclusively used for detecting the touch areas that are not related to the interaction functions (for example, selecting the role, and controlling the role) in the virtual scene, for example, detection buttons of the buttons exclusively used for detecting the touch areas. In this way, in a process that the user operates the plurality of detection buttons with different sizes, the electronic device obtains, in response to touch operations on the detection buttons, touch areas corresponding to the touch operations, and then updates the virtual scene after touch areas corresponding to the touch operations are automatically determined or are determined by a user to need to be updated, so that sizes of the detection buttons included in the virtual scene are adapted to the touch areas corresponding to the touch operations.

The touch entity is an object that can implement touch. For example, the touch entity is a real user. The user touches a button displayed on the electronic device with his finger, so that a touch area when the finger touches the button is detected by a sensor of the electronic device. The touch entity is a glove with a touch function. A user touches a button displayed on the electronic device with the glove, so that a touch area when the glove touches the button is detected by a sensor of the electronic device.

The touch areas that can be realized by the touch entity (namely, the touch areas corresponding to the touch operations) are detected by a sensor corresponding to a display screen on the electronic device, where the sensor includes a plurality of sensing units. In a process that the touch entity touches the plurality of buttons with different sizes, the touch entity triggers the plurality of sensing units in the sensor, and the electronic device converts the touch areas corresponding to the touch operations based on a quantity of triggered sensing units, so as to calculate, in response to the touch operations on the buttons, the touch areas corresponding to the touch operations.

In step 101, display a virtual scene and a plurality of buttons with different sizes.

For example, the plurality of buttons with different sizes are all associated with interaction functions (for example, selecting a role, and controlling the role) in the virtual scene, where the plurality of buttons with different sizes may be buttons with same or different functions. In a running process of the virtual scene, the plurality of buttons with different sizes are displayed in the virtual scene, and touch areas that can be realized by a touch entity on the buttons are obtained in response to touch operations on the plurality of buttons with different sizes displayed in the virtual scene subsequently. In this way, in the running process of the virtual scene, the touch areas that can be realized by the touch entity on the buttons can be obtained by real-time operations of the touch entity, and there is no need to additionally generate buttons not related to the interaction functions in the virtual scene, thereby detecting the touch areas that can be realized by the touch entity on the buttons, and saving resource consumption of related calculation of human-computer interaction.

Figure 5:
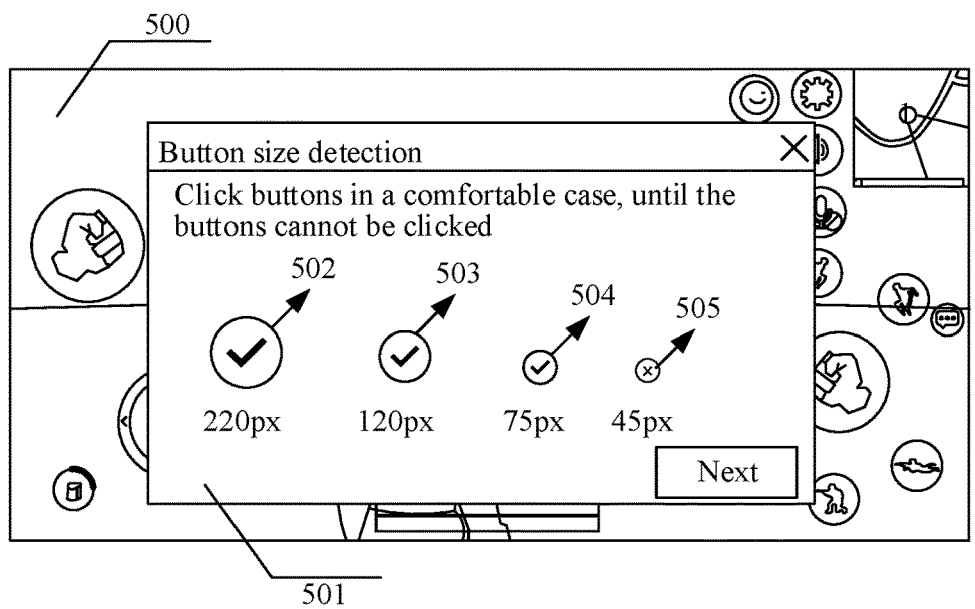
FIG. 5 is a schematic diagram of an interface of button size detection according to an embodiment of this application.

For example, all the plurality of buttons with different sizes are not related to the interaction functions (for example, selecting the role, and controlling the role) in the virtual scene, for example, prototype buttons exclusively used for detecting the touch areas. After the touch entity enters the virtual scene, the virtual scene is displayed, and an adaptive detection region independent of the virtual scene is displayed. The adaptive detection region may be displayed by a split screen or floating layer, where the adaptive detection region includes the plurality of buttons with different sizes not related to the interaction functions in the virtual scene. For example, as shown in FIG. 5, an adaptive detection region 501 is displayed by a floating layer and is separated from a virtual scene 500. The adaptive detection region 501 includes a button 502 of 220 pixels (px), a button 503 of 120 px, a button 504 of 75 px, and a button 505 of 45 px; and subsequently suspends or continues, in response to touch operations on the plurality of buttons with different sizes in the adaptive detection region, an interaction process in the virtual scene, and obtains the touch areas that can be realized by the touch entity. In a process that the adaptive detection region detects the touch areas that can be realized by the touch entity, the progress of the virtual scene may be suspended at any time, or continued.

Following the above example, before the adaptive detection region independent of the virtual scene is displayed, a button adaptive detection entrance is displayed in the virtual scene; and in response to a trigger operation on the button adaptive detection entrance, the operation of displaying an adaptive detection region independent of the virtual scene is determined to be performed.

Figure 6:
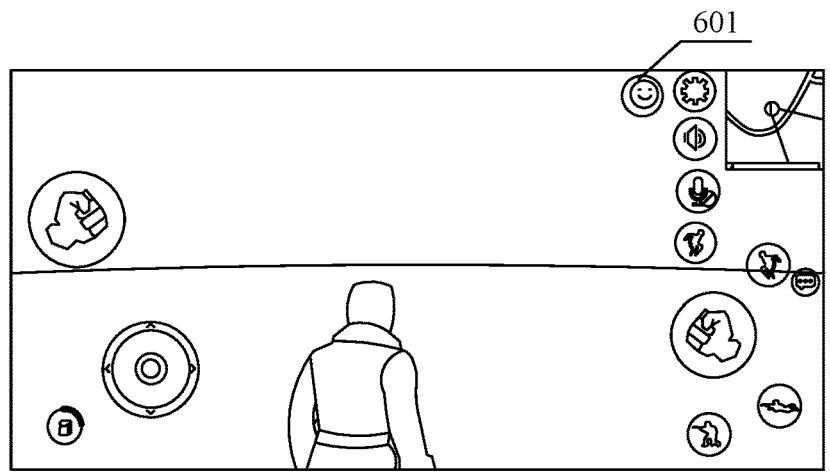
FIG. 6 is a schematic diagram of an interface of a button adaptive detection entrance according to an embodiment of this application.

As shown in FIG. 6, after a touch entity enters a virtual scene, a button adaptive detection entrance 601 is displayed in the virtual scene. After the touch entity triggers the button adaptive detection entrance 601 through an operation such as clicking or pressing, the adaptive detection region 501 independent of the virtual scene shown in FIG. 5 is displayed.

A trigger operation is not limited in this embodiment of this application, for example, the trigger operation may be a click operation, or a touch-type operation such as a long press operation.

Following the above example, before the button adaptive detection entrance is displayed in the virtual scene, a frequency of which the buttons included in the virtual scene are touched by mistake by the touch entity; and the operation of displaying a button adaptive detection entrance in the virtual scene is determined to be performed in a case that the frequency is greater than a frequency threshold.

For example, after the touch entity enters the virtual scene, when mistakes occur frequently in a process that the touch entity runs in the virtual scene, that is, when the frequency of which the buttons included in the virtual scene are touched by mistake by the touch entity is greater than the frequency threshold, the adaptive detection region 501 shown in FIG. 5 is popped up automatically.

In step 102, obtain, in response to touch operations on the plurality of buttons with different sizes, touch areas corresponding to the touch operations.

Types of the touch areas that can be realized by the touch entity include a minimum touch area and a maximum touch area. After the minimum touch area and the maximum touch area that can be realized by the touch entity are obtained, the minimum touch area and the maximum touch area are displayed in the virtual scene.

A plurality of buttons with different sizes are displayed in a virtual scene, and touch areas that can be realized by a touch entity are detected by the plurality of buttons with different sizes, so that sizes of the buttons included in the virtual scene are adjusted based on the touch areas that can be realized by the touch entity. In this way, there is no need to manually adjust the buttons included in the virtual scene, and cumbersome manual operations are reduced, thereby automatically adjusting the sizes of the buttons in the virtual scene, and improving efficiency of human-computer interaction in the virtual scene.

Figure 4B:
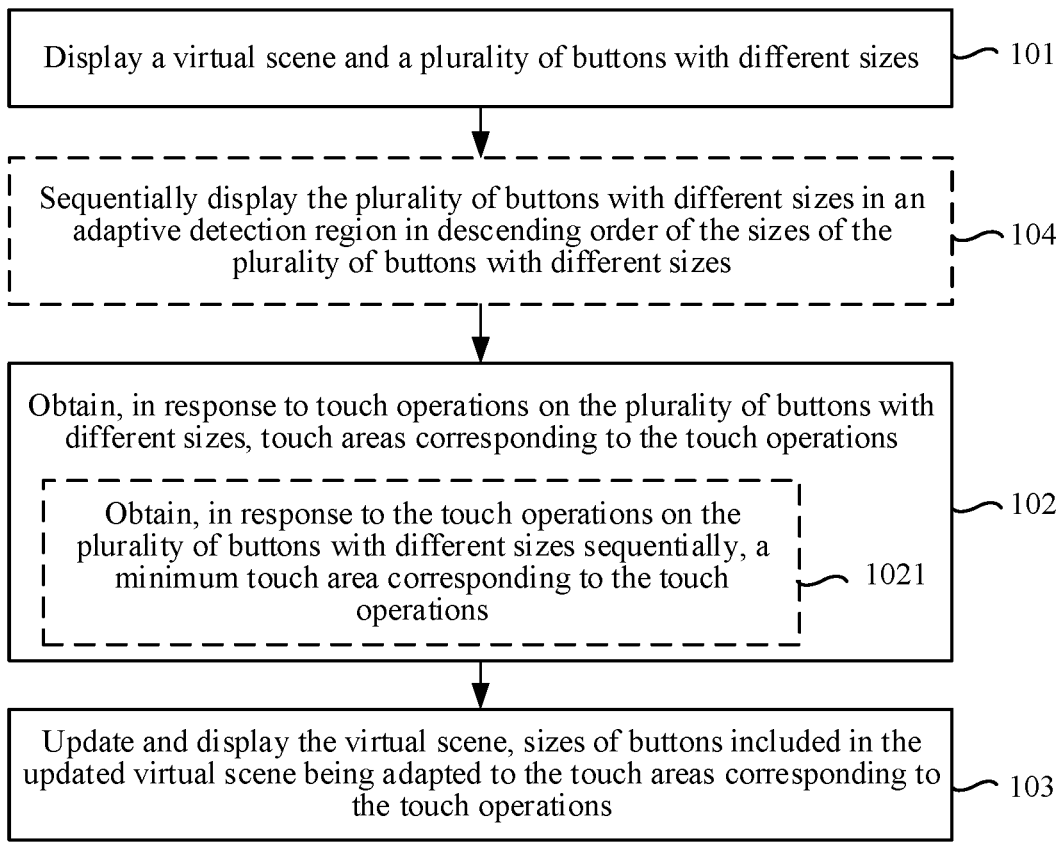
FIG. 4B is another schematic flowchart of an adaptive display method for a virtual scene according to an embodiment of this application.

FIG. 4B is an optional schematic flowchart of an adaptive display method for a virtual scene according to an embodiment of this application. FIG. 4B shows that FIG. 4A further includes step 104, and step 102 may be implemented by step 1021, where types of the touch areas that can be realized by the touch entity include the minimum touch area. In step 104, sequentially display the plurality of buttons with different sizes in the adaptive detection region in descending order of the sizes of the plurality of buttons with different sizes. In step 1021, obtain, in response to the touch operations on the plurality of buttons with different sizes sequentially, the minimum touch area corresponding to the touch operations.

As shown in FIG. 5, the button 502 of 220 px, the button 503 of 120 px, the button 504 of 75 px, and the button 505 of 45 px are sequentially displayed in the adaptive detection region 501 from left to right, that is, the button 502, the button 503, the button 504, and the button 505 are arranged in descending order of the sizes of the buttons. The touch entity sequentially clicks the button 502, the button 503, the button 504, and the button 505 from left to right, so as to obtain the minimum touch area that can be realized by the touch entity in the process of clicking the button 502, the button 503, the button 504, and the button 505.

In some embodiments, the obtaining a minimum touch area corresponding to the touch operations includes: for a button with any size of the plurality of buttons with different sizes, performing the following processing: in a case that a number of times that the button with any size is touched by mistake is greater than a mistaken touch threshold, determining a size that meets a preset condition of the plurality of sizes as the minimum touch area corresponding to the touch operations, the preset condition including: being adjacent to the any size and greater than the any size.

As shown in FIG. 5, when a number of times that a button with a specific size is touched by mistake by the touch entity is greater than the mistaken touch threshold in a process of detecting touch areas, a size that is adjacent to the size and is greater than the size is determined as the minimum touch area that can be realized by the touch entity. For example, if the button 505 is touched by mistake twice, a number of times that the button with the size of 45 px is touched by mistake is greater than the mistaken touch threshold (for example, the mistaken touch threshold is set as 1), and a size (namely, 75 px) that is adjacent to the 45 px and is greater than the 45 px is determined as the minimum touch area that can be realized by the touch entity.

Figure 7:
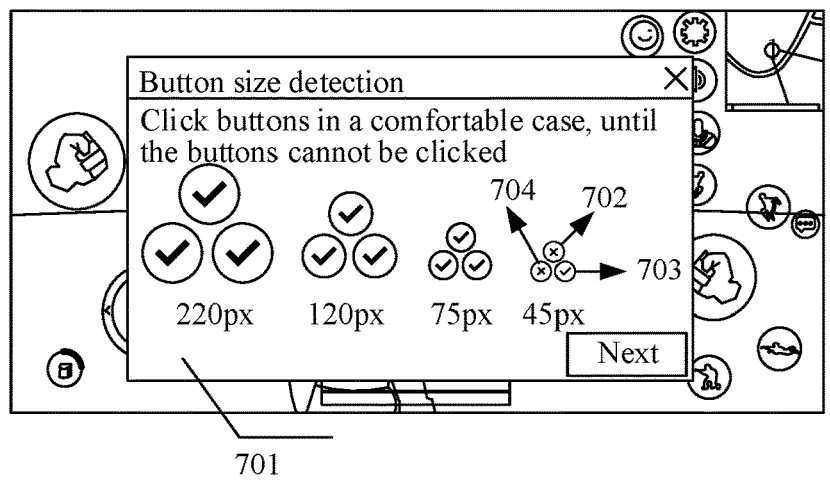
FIG. 7 is a schematic diagram of an interface of button size detection according to an embodiment of this application.

As shown in FIG. 7, there are a plurality of buttons with a same size, for example, buttons of 45 px includes a button 702, a button 703, and a button 704. When a number of times that a button with a specific size is touched by mistake by a touch entity is greater than the mistaken touch threshold in a process of detecting touch areas, a size that is adjacent to the size and is greater than the size is determined as the minimum touch area that can be realized by the touch entity. For example, if the button 702 and the button 704 are touched by mistake during detection, a number of times that the buttons with the size of 45 px are touched by mistake is greater than the mistaken touch threshold (for example, the mistaken touch threshold is set as 1), and a size (namely, 75 px) that is adjacent to the 45 px and is greater than the 45 px is determined as the minimum touch area that can be realized by the touch entity.

In some embodiments, types of the touch areas include a maximum touch area; and the obtaining touch areas corresponding to the touch operations includes: obtaining a fingerprint applied to each of the buttons, and using an area of the fingerprint as the maximum touch area corresponding to the touch operations.

Figure 8:
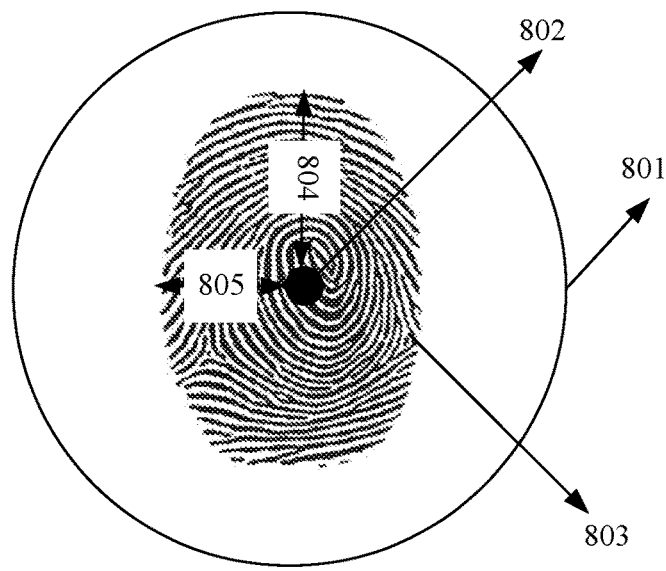
FIG. 8 is a schematic diagram of an interface of maximum button size detection according to an embodiment of this application.

As shown in FIG. 8, in a process of detecting the touch areas, a fingerprint 802 applied to a button 801 by a touch entity is obtained, and a center of the fingerprint 802 is a center 803. A maximum distance 804 between the center 803 and an edge of the fingerprint is used as a radius r1 of the fingerprint, and an area of a circle with the radius r1 (namely, an area of the fingerprint) is used as a maximum touch area that can be realized by the touch entity; or a minimum distance 805 between the center 803 and an edge of the fingerprint is used as a radius r2 of the fingerprint, and an area of a circle with the radius r2 (namely, the area of the fingerprint) is used as the maximum touch area that can be realized by the touch entity.

For example, in the process of detecting the touch areas, a plurality of corresponding fingerprints, when the button is pressed by the touch entity for a plurality of times, are obtained, and a fingerprint with a maximum area of the plurality of fingerprints is used as the fingerprint applied to the button by the touch entity.

Following the above example, the obtaining a fingerprint applied to each of the buttons includes: obtaining a plurality of corresponding fingerprints when the button is pressed for a plurality of times; and for any fingerprint of the plurality of fingerprints, performing the following processing: when a duration over which an area of the fingerprint remains unchanged in a pressing process exceeds a duration threshold, using the fingerprint as the fingerprint applied to the button.

For example, because a touch entity is unstable when pressing a button, a plurality of corresponding fingerprints, when the button is pressed by the touch entity for a plurality of times, are obtained unstably, and it is possible that the fingerprints are not obtained when the touch entity is comfortable, that is, a maximum touch area obtained in this case does not conform to a usage habit of the touch entity, which easily results in mistaken touch.

To obtain fingerprints that conform to the usage habit of the touch entity, in a process of detecting touch areas, when a duration over which an area of a fingerprint remains unchanged exceeds a duration threshold, the fingerprint is used as the fingerprint applied to a button by the touch entity, so as to obtain stable fingerprints. That is, for fingerprints obtained when the touch entity is comfortable, a maximum touch area obtained in this case conforms to the usage habit of the touch entity, thereby improving user experience.

In step 103, update and display the virtual scene, sizes of buttons included in the updated virtual scene being adapted to the touch areas corresponding to the touch operations.

For example, after touch areas that can be realized by a touch entity are detected by a plurality of buttons with different sizes, sizes of the buttons included in the virtual scene are adjusted based on the touch areas that can be realized by the touch entity. In this way, there is no need to manually adjust the buttons included in the virtual scene, and cumbersome manual operations are reduced, thereby automatically adjusting the sizes of the buttons in the virtual scene, and improving efficiency of human-computer interaction in the virtual scene.

Figure 9:
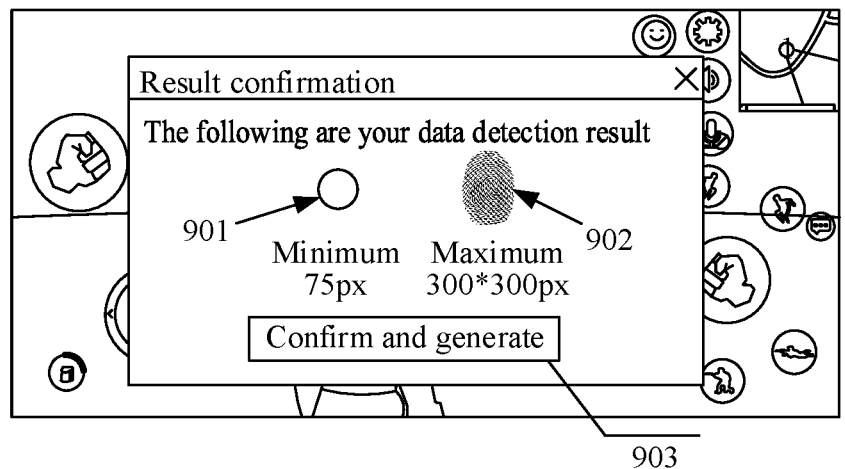
FIG. 9 is a schematic diagram of a confirming interface according to an embodiment of this application.

Types of the touch areas that can be realized by the touch entity include a minimum touch area and a maximum touch area. As shown in FIG. 9, after the minimum touch area and the maximum touch area are determined, a confirming interface may be displayed in a virtual scene. The confirming interface may be an interface independent of the virtual scene, and the confirming interface includes a minimum touch area 901 and a maximum touch area 902. After a touch entity clicks a "confirm and generate" button 903, sizes of buttons included in the virtual scene are adjusted in response to a trigger operation of the touch entity on the button 903, so that areas corresponding to the adjusted sizes of the buttons are located between the minimum touch area and the maximum touch area. In this way, there is no need to manually adjust the buttons included in the virtual scene one by one.

Following the above example, before the sizes of the buttons included in the virtual scene are adjusted, a frequency of which the buttons included in the virtual scene are touched by mistake by the touch entity; and in response to the frequency being greater than a frequency threshold, the operation of adjusting the sizes of the buttons is determined to be performed.

For example, not all the buttons included in the virtual scene need to be adjusted. Only when buttons are touched by mistake in a running process of the virtual scene, sizes of the buttons are adjusted. That is, the frequency of which the buttons included in the virtual scene are touched by mistake by the touch entity is obtained regularly; and in response to the frequency being greater than the frequency threshold, it is determined that the buttons are touched by mistake, and it is determined that the operation of adjusting the sizes of the buttons need to be performed on the buttons.

Figure 4C:
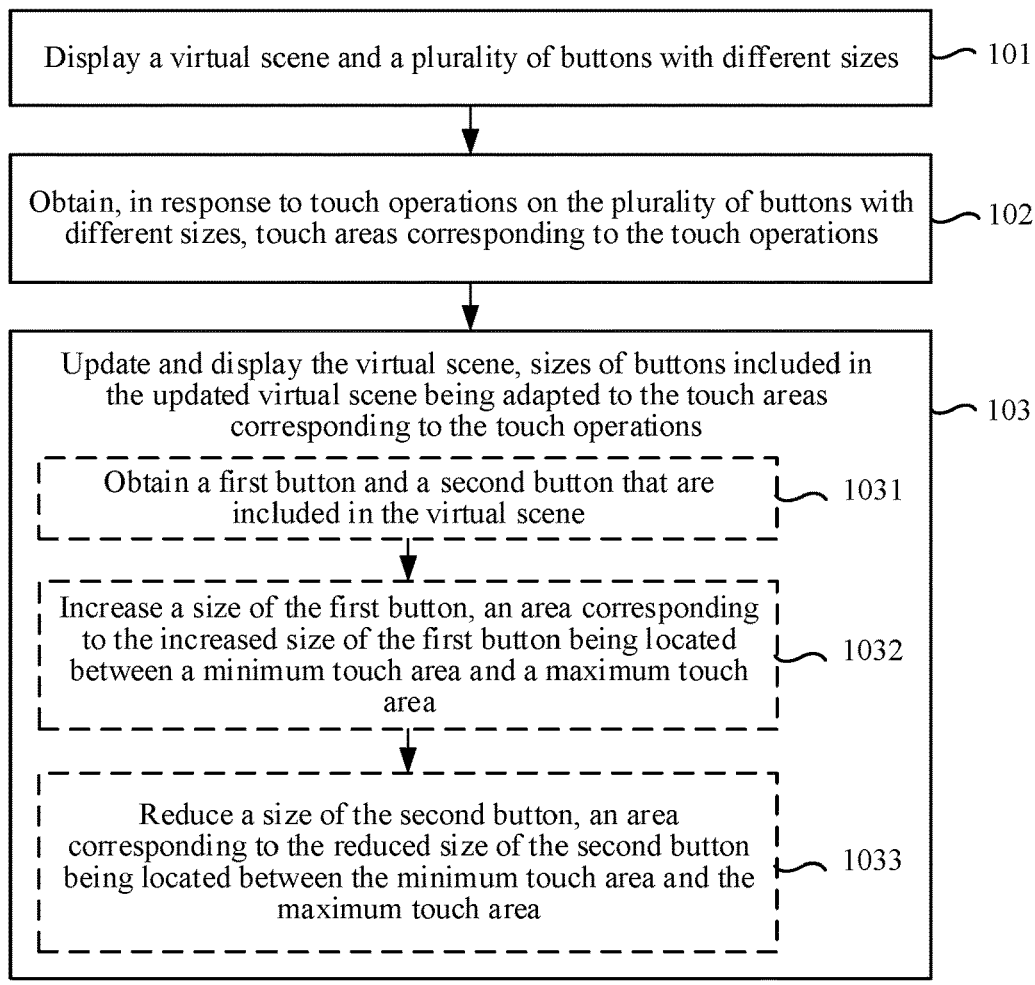
FIG. 4C is another schematic flowchart of an adaptive display method for a virtual scene according to an embodiment of this application.

FIG. 4C is an optional schematic flowchart of an adaptive display method for a virtual scene according to an embodiment of this application. FIG. 4C shows that step 103 in FIG. 4A may be implemented by steps 1031 to 1033, where types of touch areas include a minimum touch area. In step 1031, obtain a first button and a second button that are included in the virtual scene. In step 1032, increase a size of the first button, so that an area corresponding to the increased size of the first button is located between the minimum touch area and a maximum touch area. In step 1033, reduce a size of the second button, so that an area corresponding to the reduced size of the second button is located between the minimum touch area and the maximum touch area.

The area corresponding to the size of the first button is less than the minimum touch area, and the area corresponding to the size of the second button is greater than the maximum touch area. Sizes of smaller buttons are increased, and sizes of greater buttons are reduced, while button size adjustment is not performed on buttons whose sizes are already located between a minimum touch area and a maximum touch area in a virtual scene. In this way, all buttons in the virtual scene are located between the minimum touch area and the maximum touch area; and when the virtual scene is running, sizes of the buttons in the virtual scene conform to a usage habit of a touch entity, thereby reducing mistaken touch, and improving user experience.

For example, when the size of the first button included in the virtual scene is less than the minimum touch area, the size of the first button is adjusted, so that the adjusted size of the first button is the minimum touch area; and when the size of the second button included in the virtual scene is greater than the maximum touch area, the size of the second button is adjusted, so that the adjusted size of the second button is the maximum touch area.

In some embodiments, the adjusting the sizes of the buttons included in the virtual scene includes: obtaining a scaling ratio for the buttons included in the virtual scene, the scaling ratio being used for adjusting sizes of all buttons included in the virtual scene, so that areas corresponding to the adjusted sizes are located between the minimum touch area and the maximum touch area; and adjusting the sizes of the buttons included in the virtual scene according to the scaling ratio.

For example, after the minimum touch area and the maximum touch area are obtained, original sizes of all the buttons in the virtual scene are determined, and adjusted sizes of all the buttons included in the virtual scene are determined through calculation, so that areas corresponding to the adjusted sizes are located between the scaling ratio between the minimum touch area and the maximum touch area, and the sizes of the buttons included in the virtual scene are adjusted according to the scaling ratio. In this way, the areas corresponding to the adjusted sizes in the virtual scene are located between the minimum touch area and the maximum touch area, thereby automatically adjusting the sizes of all the buttons in the virtual scene, and improving efficiency of human-computer interaction in the virtual scene.

In some embodiments, when the scaling ratio includes a plurality of scaling ratio values, the adjusting the sizes of the buttons included in the virtual scene according to the scaling ratio includes: displaying a scaling ratio selection region, the scaling ratio selection region including the plurality of scaling ratio values; and adjusting, in response to a selection operation on the plurality of scaling ratio values included in the scaling ratio selection region, the sizes of the buttons included in the virtual scene according to a selected scaling ratio value.

The selection operation is not limited in this embodiment of this application, for example, the selection operation may be a click operation, or a long press operation.

Figure 10:
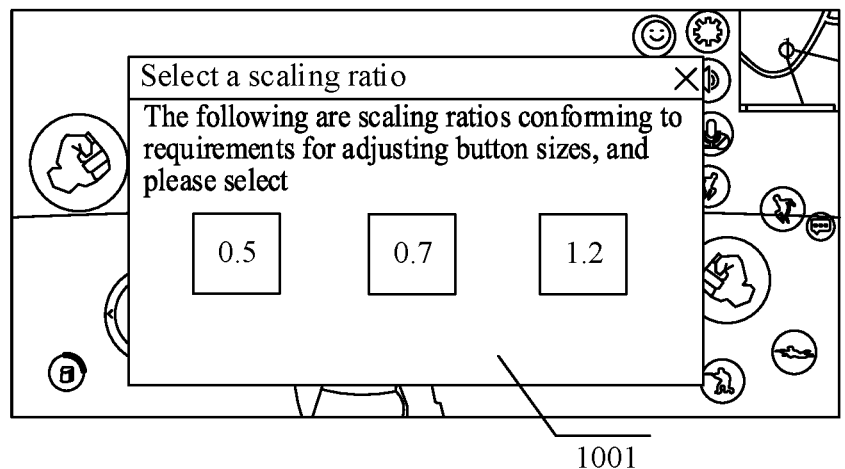
FIG. 10 is a schematic diagram of a selection interface of discrete scaling ratio values according to an embodiment of this application.

As shown in FIG. 10, when there are a plurality of discrete scaling ratio values, for example, 0.5, 0.7, and 1.2, a scaling ratio selection region 1001 may be displayed in a virtual scene. The scaling ratio selection region 1001 may be an interface independent of the virtual scene, and the selection interface 1001 includes a plurality of scaling ratios, for example, 0.5, 0.7, and 1.2. A touch entity may select one of 0.5, 0.7, and 1.2, so as to adjust, in response to a trigger operation of the touch entity on the scaling ratios, sizes of buttons included in the virtual scene according to a selected scaling ratio, so that areas corresponding to the adjusted sizes of the buttons are located between a minimum touch area and a maximum touch area. In this way, there is no need to manually adjust the buttons included in the virtual scene one by one.

Figure 11:
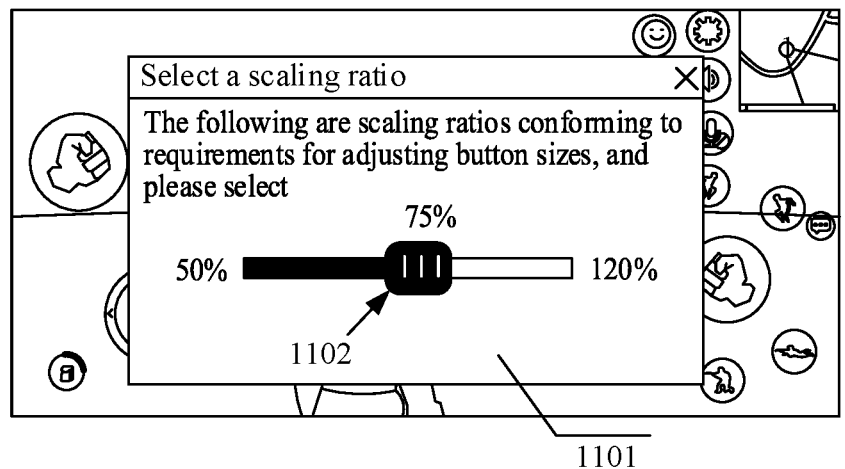
FIG. 11 is a schematic diagram of a selection interface of continuous scaling ratio values according to an embodiment of this application.

As shown in FIG. 11, when there are a plurality of continuous scaling ratio values, for example, 50% to 120%, a scaling ratio selection region 1101 may be displayed in a virtual scene. The scaling ratio selection region 1101 may be an interface independent of the virtual scene, and the scaling ratio selection region 1101 includes an adjustable slider 1102 of the plurality of scaling ratio values. A touch entity may select a scaling ratio in 50% to 120% by the adjustable slider 1102, so as to use, in response to a slide operation on the adjustable slider 1102, a selected ratio in the adjustable slider, for example, 75%, as a scaling ratio for buttons included in the virtual scene; and adjust sizes of the buttons included in the virtual scene according to the selected scaling ratio, so that areas corresponding to the adjusted sizes of the buttons are located between a minimum touch area and a maximum touch area. In this way, there is no need to manually adjust the buttons included in the virtual scene one by one.

The following describes an exemplary application of this embodiment of this application in an actual game application scenario.

During a game, there is usually a problem that different players have fingers with different sizes. For example, Asian players have slender fingers, so sizes of buttons of an entire user interface (UI) thereof are also be smaller. European and American players are naturally tall and have relatively large fingers. If the smaller buttons are still used, a series of problems may be caused, for example, the operation experience may be poor, the click may not meet expectations, and mistaken touch is easy to occur.

However, operation levels of the button size adjustment in the related technology are relatively deep, and for novices or casual players, high understanding costs are required, and it is difficult to learn and adjust a most suitable button size by themselves. Even if the players understand the adjustment method, the players still need to perform complex adjustment for a single button, which may result in adjustment on the button size for a long time, and then causes poor user experience.

To resolve the foregoing problems, this embodiment of this application provides an adaptive display method for a virtual scene, which obtains biometric data of players, so that a process of adjusting sizes of operation buttons is automated, thereby reducing understanding costs of the players to a certain extent, improving an adjustment speed, and thus improving user experience.

The adaptive display method for a virtual scene provided by this embodiment of this application includes two steps, which are respectively: detecting interaction and generating interaction. The detecting interaction is used for detecting biological characteristics of different players, and the generating interaction is used for generating corresponding UIs, so that new UIs match fingers of the players better, thereby reducing mistaken touch, and improving game experience.

A manner of detecting the interaction is as follows: in event that a player enters a customizable UI, for example, a battle interface in a game, an interface that detects a size of a finger of the player is automatically popped up and displayed. The interface includes a series of buttons whose sizes are arranged in descending order, and finger data may be recorded by clicking a button by the player. In event that the player cannot comfortably click a button with a specific size, a minimum touchable button (namely, a minimum touchable area) of the player. Therefore, all UI buttons in the game shall not be less than the button, so as to prevent the player from not touching. After the player completes detection for the minimum touchable button, a second step is entered, and the step is used for detecting a maximum touchable area of a common finger of the player (in event that a usage frequency of a finger is greater than a threshold, the finger is the common finger), for example, left and right thumbs commonly used in a shooting game. The maximum touchable area of the player may be recorded in event that the player presses and holds a circular pattern in a center of a screen until a greater area cannot be touched continuously.

A manner of generating the interaction is as follows: a touch area interval is calculated according to the minimum touchable area and the maximum touchable area of the player. Touchable button areas in the UI cannot exceed a range of the interval. If the touchable button areas in the UI do not conform to the interval, the touchable button areas may be automatically adjusted according to the interval, to complete adjustment of sizes of all buttons in a full game UI.

Figure 12:
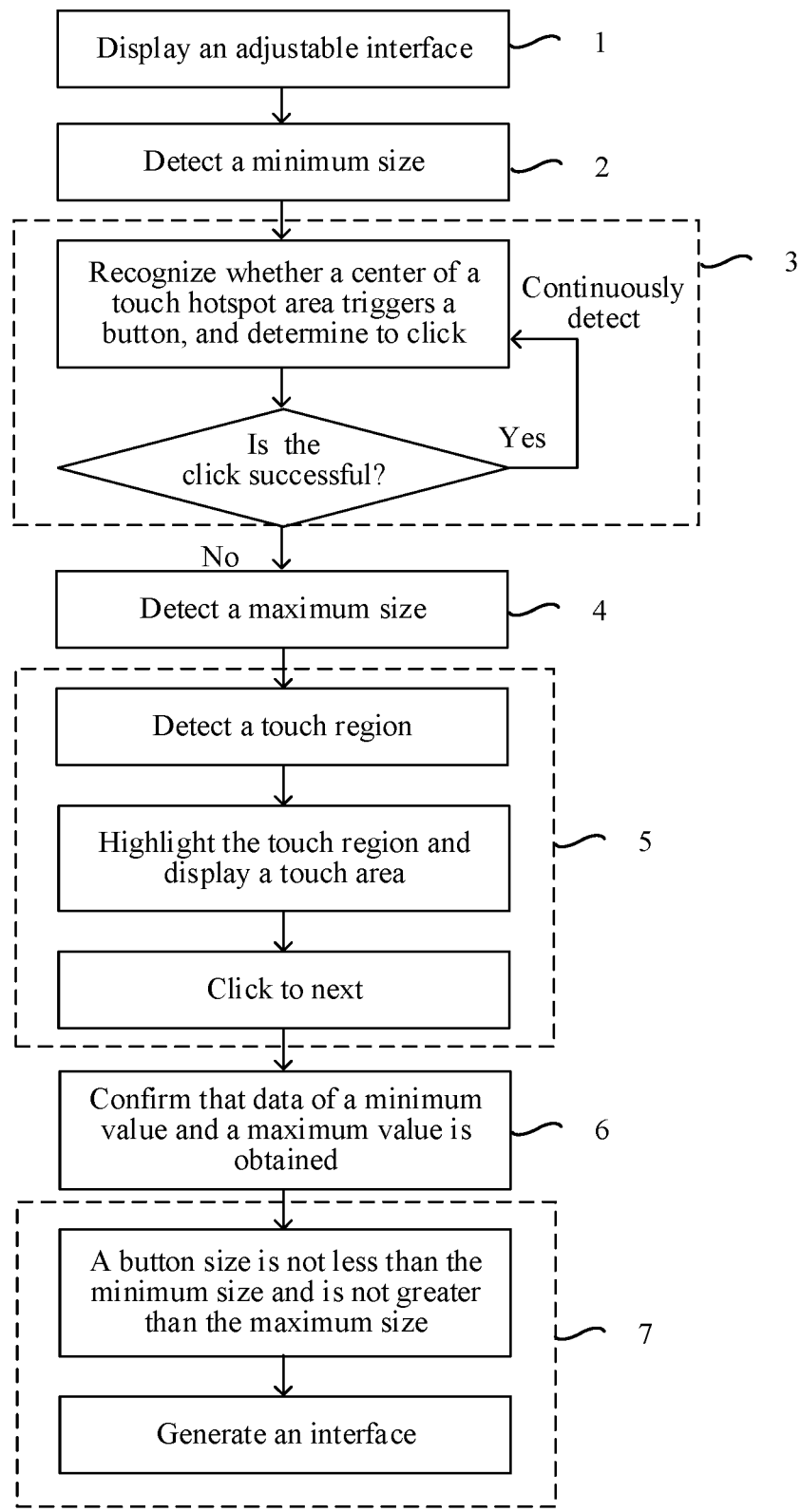
FIG. 12 is a schematic flowchart of adaptively adjusting a game user interface (UI) according to an embodiment of this application.
Figure 13A:
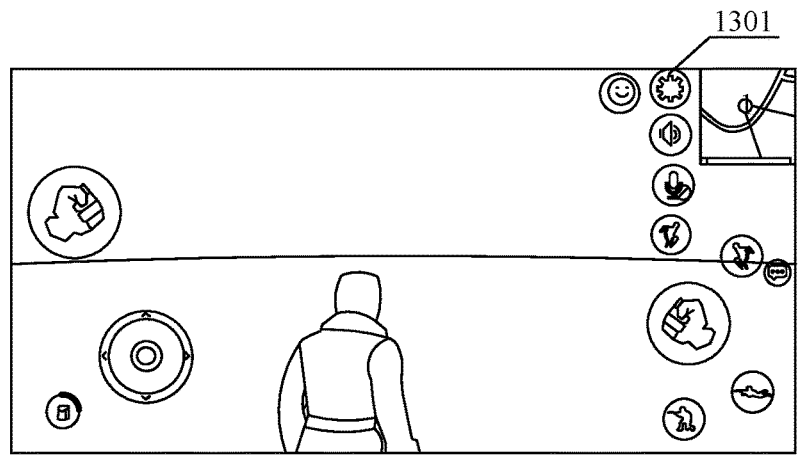
FIG. 13A is a schematic diagram of interfaces of adjusting sizes of buttons according to an embodiment of this application.

The adaptive display method for a virtual scene provided in this embodiment of this application is described in detail below, which is mainly divided into three parts: detecting a minimum area of a finger of a player can touch; detecting a maximum area of the finger of the player can touch; and automatically generating a full interface that can be interactive according to the minimum area and the maximum area. Specific steps are shown in FIG. 12, including:

Step 1: as shown in FIG. 13A, display a battle interface, the interface being an adjustable UI.

Figure 13B:
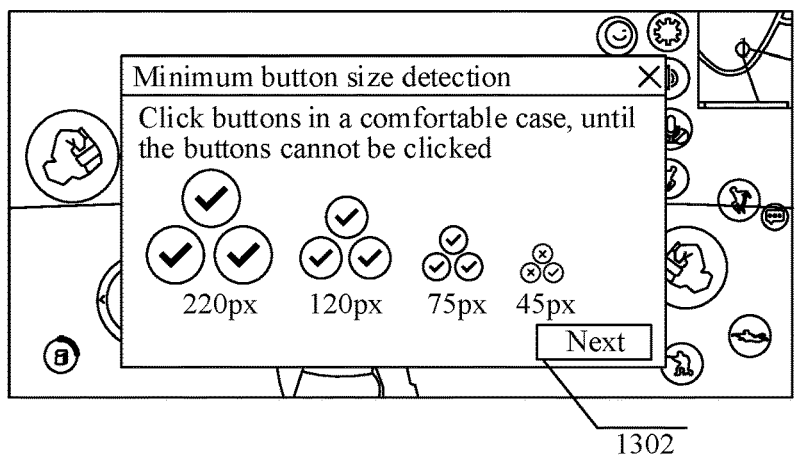
FIG. 13B is another schematic diagram of interfaces of adjusting sizes of buttons according to an embodiment of this application.

Step 2: click a setting button 1301 in FIG. 13A, and automatically display a pop-up window for detection shown in FIG. 13B, to enter minimum button size detection.

Step 3: in a process of the minimum button size detection, a player sequentially clicks buttons arranged in descending order in FIG. 13B, and buttons are triggered by recognizing a center of a touch hotspot area, to determine that the buttons are clicked successfully. In event that a situation that a button cannot be clicked occurs, the detection is terminated, and a minimum touchable button area is recorded.

For the minimum button size detection, a detection manner is as follows: determine whether a center point of a graphic area of a contact surface between a finger and a screen is within a button region; if the center point of the graphic area is within the button region, determine that the click is successful; and conversely, if the center point of the graphic area is outside the button region, determine that the click fails, and a button function is not triggered.

According to the above technical principles, when the minimum button size detection is performed according to FIG. 13B, stacked three prototype buttons need to be clicked sequentially in descending order (a three-for-a-group stack button detection method is used, to avoid an error of single button detection). If the click is successful, the prototype buttons are displayed in green; and conversely, if the click fails, the prototype buttons are displayed in red. When the player completes successful click of the three stacked buttons, detection for next group of minimum button may be entered. In smaller stacked buttons, it is more likely to encounter a situation that the click does not take effect, or the click fails. As shown in FIG. 13B, the click fails when a button with size of 45 px is clicked. When the click fails, subsequent buttons with smaller sizes are not displayed, and a size corresponding to a previous button that is completely clicked successfully is recorded as a minimum button size, for example, 75 px is used as the minimum button size.

Step 4: click a "next" button 1302 in FIG. 13B after completing the minimum button size detection, to enter maximum size area detection.

Figure 13C:
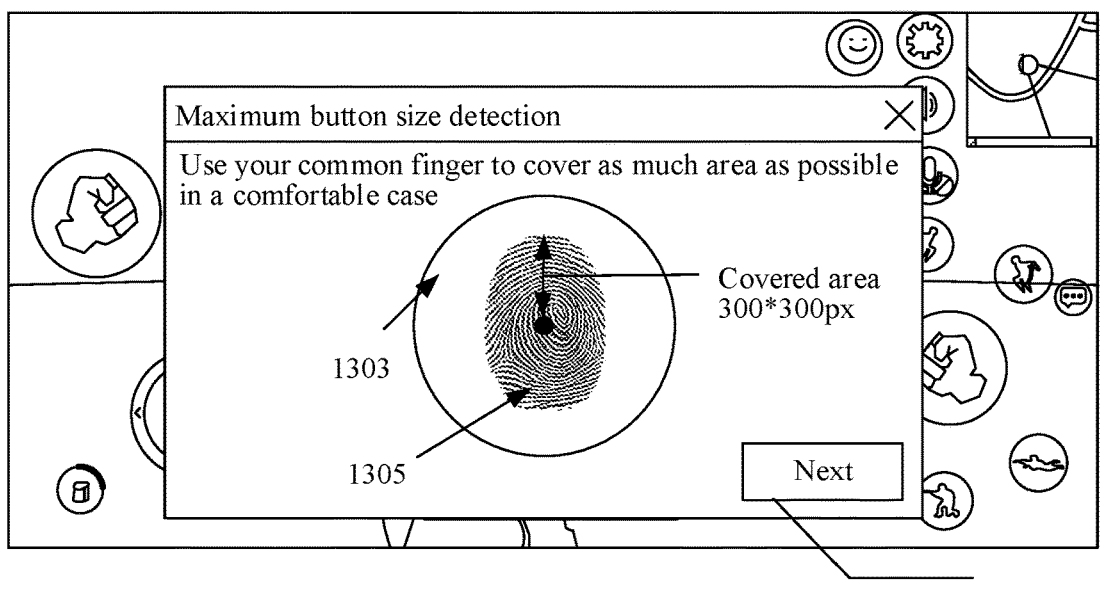
FIG. 13C is another schematic diagram of interfaces of adjusting sizes of buttons according to an embodiment of this application.

Step 5: as shown in FIG. 13C, in steps of the maximum size area detection, an area 1303 in a screen needs to be covered as much as possible, until the area cannot be covered. In this case, a maximum touchable button area is recorded, and a touch area is displayed by highlighting in a touch region. A "next" button 1304 in FIG. 13C is clicked, to enter a confirming interface shown in FIG. 13D.

For the maximum button size detection, a touch screen detection manner is as follows: a fixed touchable region is used as a graphics detection board, and a player needs to use a common finger to cover the board as much as possible. When a screen detects a touch, an area 1305 that is being touched is rendered in green, which is used for representing the player's actual touchable area. If any touch is not detected in the region, a color of the board remains unchanged. Meanwhile, a geometric center point of a graphic which the player successfully touches is used as a center of a circle, and a distance r from an edge of the touched graphic to the center of the circle is calculated as a radius. An area of a circle may be calculated according to a value of r, and the area is recorded as the maximum touched button size of the player.

Figure 13D:
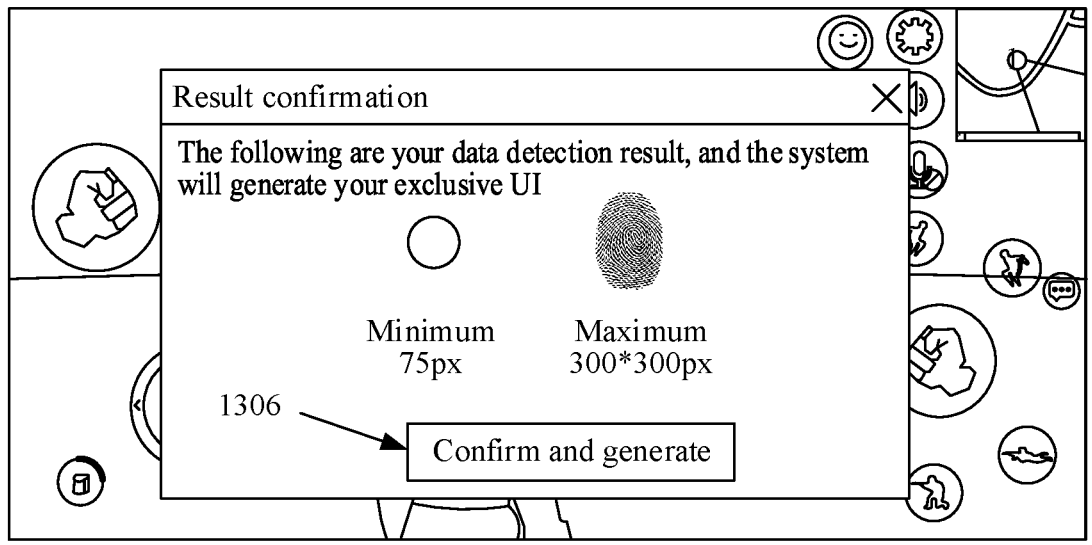
FIG. 13D is another schematic diagram of interfaces of adjusting sizes of buttons according to an embodiment of this application.

Step 6: as shown in FIG. 13D, display a minimum button area and a maximum button area, and click a "confirm and generate" button 1306 in FIG. 13D, to generate an interface.

As shown in FIG. 13D, the minimum button area is recorded as a minimum value A (for example, 75 px shown in FIG. 13D), and the maximum button area is recorded as a maximum value B ((for example, 300*300 px shown in FIG. 13D).

Step 7: generate the interface, and end the procedure.

Figure 13E:
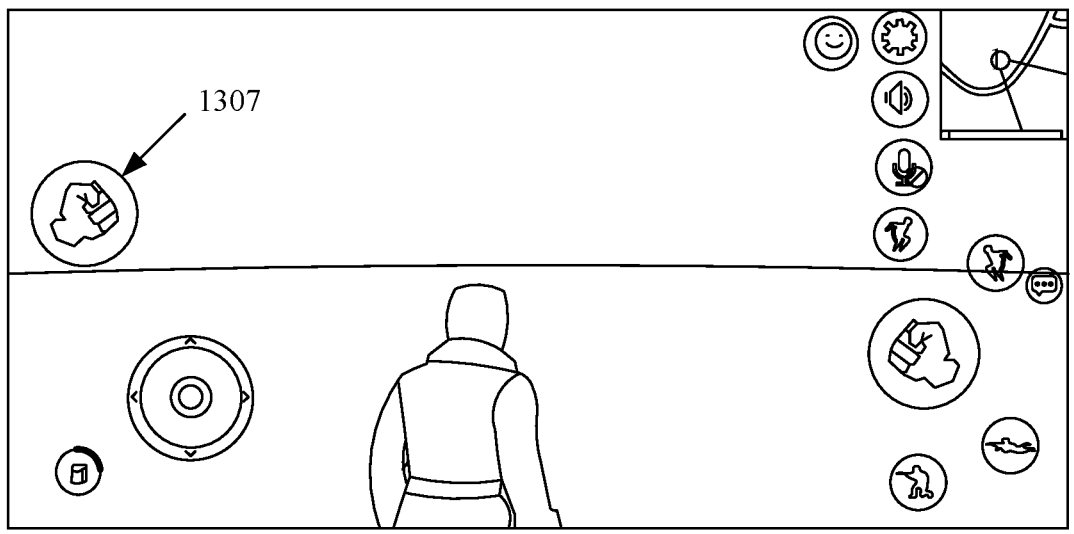
FIG. 13E is another schematic diagram of interfaces of adjusting sizes of buttons according to an embodiment of this application.

As shown in FIG. 13A, the battle interface is formed by various buttons with different sizes, which include a part of buttons with smaller sizes nearby an upper-right-corner minimap and buttons with a maximum size in the figure, for example a movable joystick and an attack button. After the minimum button area and the maximum button area recorded according to biographic characteristics of the player are determined, it is necessary to detect whether sizes of all buttons in the existing UI conform to [A, B], that is, not less than A and not greater than B. If sizes of some buttons do not conform to [A, B], for example, a size of a button is less than A, the size of the button is automatically adjusted to A, until the sizes of all the buttons conform to [A, B]. Therefore, the interface is generated, for example, an interface shown in FIG. 13E is generated. For example, a size of an attack button 1307 is automatically adjusted to B.

In conclusion, this embodiment of this application directly obtains biometric data of the player by detecting a button size, and a full UI can be customized according to the biometric data, which improves efficiency of adjusting a customized interface by the player, and enhances user experience.

So far, the adaptive display method for a virtual scene provided in this embodiment of this application has been described with reference to the exemplary application and implementation of the terminal provided by this embodiment of this application. The following continues to describe solutions that each module cooperates to realize adaptive display of a virtual scene in an adaptive display apparatus 455 for a virtual scene provided in an embodiment of this application.

a display module 4551, configured to display a virtual scene and a plurality of buttons with different sizes; a processing module 4552, configured to obtain, in response to touch operations on the plurality of buttons with different sizes, touch areas corresponding to the touch operations; and an update module 4553, configured to update and display the virtual scene, sizes of buttons included in the updated virtual scene being adapted to the touch areas corresponding to the touch operations.

In some embodiments, the display module 4551 is further configured to display the plurality of buttons with different sizes in the virtual scene in a running process of the virtual scene, the buttons being all associated with interaction functions in the virtual scene; and the processing module 4552 is further configured to obtain, in response to the touch operations on the plurality of buttons with different sizes that are displayed in the virtual scene, the touch areas corresponding to the touch operations on the buttons.

In some embodiments, the display module 4551 is further configured to display the virtual scene, and displaying an adaptive detection region independent of the virtual scene, the adaptive detection region including a plurality of buttons with different sizes that are not related to the interaction functions in the virtual scene; and the processing module 4552 is further configured to suspend or continue, in response to touch operations on the plurality of buttons with different sizes in the adaptive detection region, an interaction process in the virtual scene, and obtain the touch areas corresponding to the touch operations.

In some embodiments, the adaptive display apparatus 455 for a virtual scene further includes: a setting module 4554, configured to display a button adaptive detection entrance in the virtual scene; and determine, in response to a trigger operation on the button adaptive detection entrance, to perform the operation of displaying an adaptive detection region independent of the virtual scene.

In some embodiments, the setting module 4554 is further configured to obtain a frequency of which the buttons included in the virtual scene are touched by mistake; and determine, in response to the frequency being greater than a frequency threshold, to perform the operation of displaying a button adaptive detection entrance in the virtual scene.

In some embodiments, types of the touch areas include a minimum touch area; and the processing module 4552 is further configured to sequentially display the plurality of buttons with different sizes in the adaptive detection region in descending order of the sizes of the plurality of buttons with different sizes; and obtain, in response to the touch operations on the plurality of buttons with different sizes sequentially, the minimum touch area corresponding to the touch operations.

In some embodiments, the processing module 4552 is further configured to perform, for a button with any size of the plurality of buttons with different sizes, the following processing: in event that a number of times that the button with any size is touched by mistake is greater than a mistaken touch threshold, determining a size that meets a preset condition of the plurality of sizes as the minimum touch area corresponding to the touch operations, the preset condition including: being adjacent to the any size and greater than the any size.

In some embodiments, types of the touch areas include a maximum touch area; and the processing module 4552 is further configured to obtain a fingerprint applied to each of the buttons, and use an area of the fingerprint as the maximum touch area corresponding to the touch operations.

In some embodiments, the processing module 4552 is further configured to obtain a plurality of corresponding fingerprints when the button is pressed for a plurality of times, and use a fingerprint with a maximum area of the plurality of fingerprints as the fingerprint applied to the button.

In some embodiments, the processing module 4552 is further configured to obtain a plurality of corresponding fingerprints when the button is pressed for a plurality of times; and perform, for any fingerprint of the plurality of fingerprints, the following processing: when a duration over which an area of the fingerprint remains unchanged in a pressing process exceeds a duration threshold, use the fingerprint as the fingerprint applied to the button.

In some embodiments, the update module 4553 is further configured to adjust the sizes of the buttons included in the virtual scene, areas corresponding to the adjusted sizes of the buttons being located between the minimum touch area and the maximum touch area.

In some embodiments, the update module 4553 is further configured to obtain a frequency of which the buttons included in the virtual scene are touched by mistake; and determine, in the virtual scene in response to the frequency being greater than a frequency threshold, to perform the operation of adjusting the sizes of the buttons included.

In some embodiments, the update module 4553 is further configured to obtain a first button and a second button that are included in the virtual scene, an area corresponding to a size of the first button being less than the minimum touch area, and an area corresponding to a size of the second button being greater than the maximum touch area; increase the size of the first button, an area corresponding to the increased size of the first button being located between the minimum touch area and the maximum touch area; and reduce the size of the second button, an area corresponding to the reduced size of the second button being located between the minimum touch area and the maximum touch area.

In some embodiments, the update module 4553 is further configured to obtain a scaling ratio for the buttons included in the virtual scene, the scaling ratio being used for adjusting sizes of all buttons included in the virtual scene, and areas corresponding to the adjusted sizes being located between the minimum touch area and the maximum touch area; and adjust the sizes of the buttons included in the virtual scene according to the scaling ratio.

In some embodiments, the update module 4553 is further configured to display, where the scaling ratio includes a plurality of scaling ratio values, a scaling ratio selection region, the scaling ratio selection region including the plurality of scaling ratio values; and adjust, in response to a selection operation on the plurality of scaling ratio values included in the scaling ratio selection region, the sizes of the buttons included in the virtual scene according to a selected scaling ratio value.

In conclusion, the adaptive display apparatus for a virtual scene provided in this embodiment of this application has the following beneficial effects: touch areas that can be realized by a touch entity are detected through a plurality of buttons with different sizes in a virtual scene, and sizes of the buttons included in the virtual scene are adjusted to be adapted to the touch areas that can be realized by the touch entity. In this way, the sizes of the buttons can be adjusted with high-efficiency human-computer interaction operations, efficiency of human-computer interaction in the virtual scene can be improved, and resource consumption of graphics processing hardware for related computing of the human-computer interaction can be significantly saved.

An embodiment of this application provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the foregoing adaptive display method for a virtual scene in this embodiment of this application.

An embodiment of this application provides a computer-readable storage medium storing executable instructions, the executable instructions, when executed by a processor, causing the processor to implement the adaptive display method for a virtual scene provided in the embodiments of this application. For example, the adaptive display method for a virtual scene shown in FIG. 4A to FIG. 4C.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. An adaptive display method for a virtual scene, performed by an electronic device with a touchscreen, the method comprising:
    displaying the virtual scene on the touchscreen and at least one second button associated with at least one interaction function in the virtual scene, wherein the at least one second button is displayed at a first size;
    displaying a set of first buttons on the touchscreen, wherein the set of first buttons is not interactive with the virtual scene and comprises at least two subsets of buttons, and wherein each subset of the at least two subsets of buttons comprises a plurality of buttons having:
        a same size as each other button within a respective subset of the at least two subsets of buttons, and
        a different size from all other buttons within other subsets of the at least two subsets of buttons;
    obtaining, in response to a plurality of touch operations on the set of first buttons by a user of the electronic device, at least one touch parameter realized from the plurality of touch operations on the set of first buttons, the at least one touch parameter comprising at least one of a minimum touch area or a maximum touch area, wherein each of the at least two subsets of buttons receives at least one of the plurality of touch operations; and
    adapting display of the at least one second button from the first size to a second size, wherein the second size is determined based on the obtained at least one touch parameter and the second size is different from the first size.

2. The method according to claim 1, wherein:
    the set of first buttons is associated with the at least one second button associated with the at least one interaction function in the virtual scene;
    the obtaining the at least one touch parameter comprises:
        obtaining, in response to the plurality of touch operation on each of the at least two subsets of buttons associated with the at least one second button associated with the at least one interaction function in the virtual scene, the at least one touch parameter.

3. The method according to claim 1, wherein displaying the set of first buttons comprises:
    displaying, in an adaptive detection region independent of the virtual scene, the set of first buttons.

4. The method according to claim 3, wherein before displaying the set of first buttons in the adaptive detection region independent of the virtual scene, the method further comprises:
    displaying a button adaptive detection entrance in the virtual scene; and
    determining, in response to a trigger operation on the button adaptive detection entrance, to display the adaptive detection region independent of the virtual scene.

5. The method according to claim 3, wherein the at least one touch parameter comprises the minimum touch area, and wherein:
    displaying the set of first buttons further comprises:
        sequentially displaying the set of first buttons in a descending order of the different sizes in the adaptive detection region; and
    obtaining the at least one touch parameter corresponding to the plurality of touch operations comprises:
        obtaining, in response to the plurality of touch operation on the set of first buttons, the minimum touch area corresponding to the plurality of touch operations.

6. The method according to claim 1, wherein before displaying the set of first buttons on the touchscreen, the method further comprises:
    obtaining a frequency of which the at least one second button is touched by mistake; and
    determining, in response to the frequency being greater than a frequency threshold, to display the set of first buttons on the touchscreen.

7. The method according to claim 1, wherein displaying the set of first buttons comprises:
    for each of the at least two subsets, displaying the plurality of buttons of the respective subset adjacent to each other.

8. The method according to claim 1, wherein a first button size of a first subset of the at least two subsets is larger than a second button size of a second subset of the at least two subsets, and wherein the obtaining the minimum touch area corresponding to the plurality of touch operations comprises:
    when the second subset is determined not to be touched successfully based on a predetermined criterion, determining the minimum touch area according to the first button size of the first subset.

9. The method according to claim 1, wherein the at least one touch parameter comprises the maximum touch area; and the obtaining the at least one touch parameter corresponding to the plurality of touch operations comprises:
    obtaining a fingerprint applied to the set of first buttons, and using an area of the fingerprint as the maximum touch area corresponding to the plurality of touch operations.

10. The method according to claim 9, wherein the obtaining the fingerprint applied to the set of first buttons comprises:
    obtaining a plurality of corresponding fingerprints when the set of first buttons is pressed a plurality of times; and
    using a fingerprint with a maximum area among the plurality of fingerprints as the fingerprint applied to the set of first buttons.

11. The method according to claim 9, wherein obtaining the fingerprint applied to the set of first buttons comprises:
    obtaining a plurality of corresponding fingerprints when the button is pressed a plurality of times; and
    for any fingerprint of the plurality of fingerprints, when a duration over which an area of the fingerprint remains in a pressing state exceeds a duration threshold, using the fingerprint as the fingerprint applied to the set of first buttons.

12. The method according to claim 1, wherein the at least one second button is adapted according to:
- obtaining a second button of the at least one second button that is smaller than a minimum touch area of the at least one touch parameter; and
- increasing a size of the second button to equal to or larger than the minimum touch area.

13. The method according to claim 1, wherein:
the at least one second button comprises a plurality of second buttons; and
the plurality of second buttons is adapted according to:
- obtaining a scaling ratio for adjusting sizes of the plurality of second buttons, and areas corresponding to the adjusted sizes being larger than or equal to the minimum touch area; and
- adjusting the sizes of the plurality of second buttons according to the scaling ratio.

14. The method according to claim 13, wherein the scaling ratio is selected from a plurality of scaling ratio candidates by the user.

15. An adaptive display apparatus for a virtual scene, comprising:
a memory storing a plurality of instructions; and
a processor configured to execute the plurality of instructions, and upon execution of the plurality of instructions, is configured to:
- display, via a display, the virtual scene on a touchscreen and at least one second button associated with at least one interaction function in the virtual scene, wherein the at least one second button is displayed at a first size;
- display, via the display, a set of first buttons, wherein the set of first buttons is not interactive with the virtual scene and comprises at least two subsets of buttons, and wherein each subset of the at least two subsets of buttons comprises a plurality of buttons having:
  - a same size as each other button within a respective subset of the at least two subsets of buttons, and
  - a different size from all other buttons within other subsets of the at least two subsets of buttons;
- obtain, in response to a plurality of touch operations on the set of first buttons, at least one touch parameter realized from the plurality of touch operations on the set of first buttons, the at least one touch parameter comprising at least one of a minimum touch area or a maximum touch area, wherein each of the at least two subsets of buttons receives at least one of the plurality of touch operations; and
- adapt display of the at least one second button from the first size to a second size, wherein the second size is determined based on the obtained at least one touch parameter and the second size is different from the first size.

16. The adaptive display apparatus according to claim 15, wherein the set of first buttons is associated with the at least one second button associated with the at least one interaction function in the virtual scene, and
wherein, in order to obtain the at least one touch parameter corresponding to the plurality of touch operations, the processor, upon execution of the plurality of instructions, is configured to obtain, in response to the plurality of touch operations on the set of first buttons associated with the at least one interaction function in the virtual scene, the at least one touch parameter.

17. The adaptive display apparatus according to claim 15, and wherein the processor, upon execution of the plurality of instructions, is further configured to:
display, in an adaptive detection region independent of the virtual scene, the set of first buttons.

18. A non-transitory computer-readable storage medium storing a plurality of instructions executable by a processor, the plurality of instructions, when executed by the processor, is configured to cause the processor to:
- display, via a display, the virtual scene on a touchscreen and at least one second button associated with at least one interaction function in the virtual scene, wherein the at least one second button is displayed at a first size;
- display, via the display, a set of first buttons, wherein the set of first buttons is not interactive with the virtual scene and comprises at least two subsets of buttons, and wherein each subset of the at least two subsets of buttons comprises a plurality of buttons having:
  - a same size as each other button within a respective subset of the at least two subsets of buttons, and
  - a different size from all other buttons within other subsets of the at least two subsets of buttons;
- obtain, in response to a plurality of touch operations on the set of first buttons, at least one touch parameter realized from the plurality of touch operations on the set of first buttons, the at least one touch parameter comprising at least one of a minimum touch area or a maximum touch area, wherein each of the at least two subsets of buttons receives at least one of the plurality of touch operations; and
- adapt display of the at least one second button from the first size to a second size, wherein the second size is determined based on the obtained at least one touch parameter and the second size is different from the first size.

* * * * *